United States Patent
Nimmagadda et al.

(10) Patent No.: US 10,469,450 B2
(45) Date of Patent: Nov. 5, 2019

(54) CREATING AND DISTRIBUTING TEMPLATE BASED SERVICE RULES

(71) Applicant: Nicira, Inc., Palo Alto, CA (US)

(72) Inventors: Srinivas Nimmagadda, San Jose, CA (US); Jayant Jain, Cupertino, CA (US); Anirban Sengupta, Saratoga, CA (US); Subrahmanyam Manuguri, San Jose, CA (US); Alok S. Tiagi, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 285 days.

(21) Appl. No.: 14/975,573

(22) Filed: Dec. 18, 2015

(65) Prior Publication Data

US 2017/0180320 A1    Jun. 22, 2017

(51) Int. Cl.
*H04L 29/06* (2006.01)
*H04L 29/08* (2006.01)
*G06F 21/62* (2013.01)

(52) U.S. Cl.
CPC ...... *H04L 63/0263* (2013.01); *G06F 21/6218* (2013.01); *H04L 63/0236* (2013.01); *H04L 67/1031* (2013.01)

(58) Field of Classification Search
CPC .. H04L 63/0263; H04L 67/10; H04L 67/1002
See application file for complete search history.

(56) References Cited

U.S. PATENT DOCUMENTS

| | | |
|---|---|---|
| 6,079,020 A | 6/2000 | Liu |
| 9,471,775 B1 | 10/2016 | Wagner et al. |
| 9,762,619 B1 | 9/2017 | Vaidya et al. |
| 9,952,892 B2 | 4/2018 | Dalal et al. |
| 2003/0041266 A1 | 2/2003 | Ke et al. |
| 2005/0032518 A1 | 2/2005 | Rajan |
| 2010/0094981 A1 | 4/2010 | Cordray et al. |
| 2010/0115101 A1 | 5/2010 | Lain et al. |
| 2010/0333165 A1* | 12/2010 | Basak ............ H04L 63/0263 726/1 |

(Continued)

OTHER PUBLICATIONS

Author Unknown, "Configuring Data Center Firewall," https://nettools.net.berkeley.edu/tools/docs/a10/thunder/ACOS_4_1_0/html/dcfw-Responsive%20HTML5/dcfw/dcfw_config/dcfw_config.htm, Mar. 24, 2016, 23 pages.

(Continued)

*Primary Examiner* — Dao Q Ho
(74) *Attorney, Agent, or Firm* — Adeli LLP

(57) ABSTRACT

Some embodiments of the invention introduce cloud template awareness in the service policy framework. Some embodiments provide one or more service rule processing engines that natively support (1) template-specific dynamic groups and template-specific rules, and (2) dynamic security tag concepts. A service rule processing engine of some embodiments natively supports template-specific dynamic groups and rules as it can directly process service rules that are defined in terms of dynamic component groups, template identifiers, template instance identifiers, and/or template match criteria. Examples of such services can include any kind of middlebox services, such as firewalls, load balancers, network address translators, intrusion detection systems, intrusion prevention systems, etc.

19 Claims, 11 Drawing Sheets

(56) References Cited

U.S. PATENT DOCUMENTS

| | | |
|---|---|---|
| 2011/0209140 A1 | 8/2011 | Scheidel et al. |
| 2012/0072910 A1 | 3/2012 | Martin et al. |
| 2012/0117230 A1 | 5/2012 | McColgan et al. |
| 2013/0018994 A1 | 1/2013 | Flavel et al. |
| 2014/0033278 A1* | 1/2014 | Nimashakavi ........ G06F 21/335 726/4 |
| 2014/0229521 A1 | 8/2014 | Meadway et al. |
| 2015/0096007 A1 | 4/2015 | Sengupta et al. |
| 2015/0229549 A1 | 8/2015 | Ennis |
| 2016/0197834 A1 | 7/2016 | Luft |
| 2016/0344696 A1 | 11/2016 | Yin |
| 2017/0180319 A1 | 6/2017 | Nimmagadda et al. |
| 2017/0180321 A1 | 6/2017 | Nimmagadda et al. |
| 2017/0180423 A1 | 6/2017 | Nimmagadda et al. |
| 2018/0063194 A1 | 3/2018 | Vaidya et al. |

OTHER PUBLICATIONS

Chen, Yaoliang, et al., "COSS: Content-based Subscription as an IoT Service," 2015 IEEE Conference on Web Services, Jun. 27-Jul. 2, 2015, 8 pages, IEEE, New York, NY, USA.

* cited by examiner

| Source | Source Port | Destination | Destination Port | Service | Instance Match Identifier | Template Identifier | Action |
|---|---|---|---|---|---|---|---|
| * | * | WS | 80 | TCP | * | 3TA | Allow |
| WS | * | AS | 8080 | TCP | Match | 3TA | Allow |
| AS | * | DS | * | SQL | Match | 3TA | Allow |
| 3TA | * | 3TA | * | * | * | 3TA | Deny |
| Any Template | * | Any Template | * | * | * | * | Deny |

*Figure 8*

Table 1102

| No | ID | Source | S. Port | Destination | D. Port | Service | AppliedTo | Instance Match | Template Identifier | Action |
|----|----|--------|---------|-------------|---------|---------|-----------|----------------|---------------------|--------|
| ▶ 📁 Firewall Rules (Rules 1-2) ——1040 |
| ✓1 | 1 | DC1 | | AppServers | | FTP | DFW | | | Drop |
| ✓2 | 2 | DC1 | | * | | SSL | DFW | | | Redirect |
| ▶ 📁 3TA Firewall Rules (Rules 3-7) ——1060    1112 |
| ✓3 | 3 | * | * | WS | 80 | TCP | DFW | * | 3TA | Allow |
| ✓4 | 4 | WS | * | AS | 8080 | TCP | DFW | Match | 3TA | Allow |
| ✓5 | 5 | AS | * | DS | * | SQL | * | Match | 3TA | Allow |
| ✓6 | 6 | 3TA | * | 3TA | * | * | * | * | 3TA | Deny |
| ✓7 | 7 | Any | * | Any | * | * | * | * | * | Deny |

Table 1104

| No | ID | Source | S. Port | Destination | D. Port | Service | AppliedTo | Instance Match | Template Identifier | Action |
|----|----|--------|---------|-------------|---------|---------|-----------|----------------|---------------------|--------|
| ▶ 📁 Firewall Rules (Rules 1-2) |
| ✓1 | 1 | DC1 | | AppServers | | FTP | DFW | | | Drop |
| ▶ 📁 3TA Firewall Rules (Rules 3-7)    1114 |
| ✓2 | 3 | * | * | WS | 80 | TCP | DFW | * | 3TA | Allow |
| ✓3 | 4 | WS | * | AS | 8080 | TCP | DFW | Match | 3TA | Allow |
| ✓4 | 5 | AS | * | DS | * | SQL | * | Match | 3TA | Allow |
| ✓5 | 6 | 3TA | * | 3TA | * | * | * | * | 3TA | Deny |
| ✓6 | 7 | Any | * | Any | * | * | * | * | * | Deny |
| ▶ 📁 Firewall Rules (Rule 2) |
| ✓7 | 2 | DC1 | | * | | SSL | DFW | | | Redirect |

*Figure 11*

CREATING AND DISTRIBUTING TEMPLATE BASED SERVICE RULES

BACKGROUND

Today, enterprise firewall policy model is typically a very simple traffic match criteria with source of traffic, destination of traffic, port/protocol of the traffic and a set of possible actions including permit, deny, etc. This policy model inherently cannot be made aware that the firewall rules are being processed to support private cloud/automation scenarios where hundreds of instances of applications are typically created out of the same application template.

Cloud administrators typically have specific security expectations at the time the template instances are deployed. For instance, administrators want to maintain instance isolation, so that different application components belonging to different instances do not communicate with each other, even though the instances are created by using the same template. Also, administrators may or may not want different application components belonging to the same instance to be able to communicate with each other by default. Specific rules are typically built based on an understanding of the existing default policy.

This fundamental mismatch in the firewall policy model results in rule or dynamic group overload. Every time a new instance of the template is created, automation frameworks create additional dynamic groups and firewall rules. These additional objects and rules create scalability and performance issues for the enterprise firewalls. Also, this mismatch results in rule and dynamic group churn. When every template instantiation results in new rule creation as well as changes to dynamic groups, the management system has to push multiple changes for each instance. This constant churn in the rule tables overwhelms the policy change systems including policy publish and audit systems. Propagating changes to the template rules becomes a challenging task, as the changes have to be implemented on a large number of instance on an instance-by-instance basis.

Another issue is rule management complexity. Firewall operations teams that manage the firewall rules find it challenging to manage and troubleshoot rule tables that grow into tens of thousands of rules. Moreover, as these template instances are deleted, the firewall rules also need to be deleted, which in most cases, is often overlooked by the administrators due to the large number of instances that have to be deleted.

BRIEF SUMMARY

Some embodiments of the invention introduce cloud template awareness in the service policy framework. Some embodiments provide one or more service rule processing engines that natively support (1) template-specific dynamic groups and template-specific rules, and (2) dynamic security tag concepts. In some embodiments, a template provides a definition of one or more layers of data compute nodes (DCNs) for deployment. The template-specified DCNs of some embodiments are servers (e.g., virtual machines or containers) that execute on host computers. For example, a three-tier application deployment might include a webserver, followed by an application server, followed by a database server. In some embodiments, a template can include one or more middleboxes between the DCNs in the template. Each deployed instance of a template is referred to as a template instance.

The service rule processing engine of some embodiments natively supports template-specific dynamic groups and rules as it can directly process service rules that are defined in terms of dynamic component groups, template identifiers, template instance identifiers, and/or template match criteria. Examples of such services can include any kind of middlebox services, such as firewalls, load balancers, network address translators, intrusion detection systems, intrusion prevention systems, etc.

When automated deployment tools deploy DNCs on host computers, these tools in some embodiments dynamically associate DCNs with tags that seamlessly associate the DCNs with dynamic component groups. In this manner, the dynamic component groups that are used to define service rules (e.g. are used to define the qualifier tuples of the service rules), can be dynamically modified when DCNs are instantiated on host computers in a datacenter.

The service rule infrastructure of some embodiments (1) can specify service rules that are defined in terms of one or more dynamic component groups, which, in turn, are associated with one or more template components (e.g., DCNs), and (2) can deploy and process the service rules as is (with the dynamic component group identifiers as rule qualifiers) in the data path. In some embodiments, the dynamic component groups can be used to specify the source qualifier and/or destination qualifier of a service rule. In addition, the rule qualifiers (i.e., rule identifiers) of the service rules of some embodiments can be expressed in terms of template identifiers, template instance identifiers and/or template match criteria.

In some embodiments, the template instance identifiers for template components are stored in the component dynamic groups. In these embodiments, the service engine processes a service rule by retrieving a template instance attribute of a source node or destination node of a data message from its component dynamic group, and then using this attribute to process the service rule.

For instance, when checking a template-based service rule that has a source or destination qualifier that is defined by reference to a component dynamic group, the service engine of some embodiments determines whether a source or destination IP address in a message's header belongs to the component dynamic group. If so, the service engine in some embodiments uses the template instance identifier that the matching component dynamic group specifies for the IP address to identify the template instance dynamic group to which the addressed source or destination node belongs. The service engine then accesses the identified template instance dynamic group to retrieve template instance attributes of the message's source or destination node, and then uses these retrieved template instance attributes to further process the service rule. When the message's header attributes and/or template/dynamic group attributes match a service rule, the service engine determines that the message matches the service rule and then performs the service action as specified by the rule's service parameter or parameters.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 8 illustrates a 3TA firewall rule section of a firewall table of some embodiments.

FIGS. 10-12 illustrate the firewall rule console of some embodiments.

DETAILED DESCRIPTION

Figure 1:
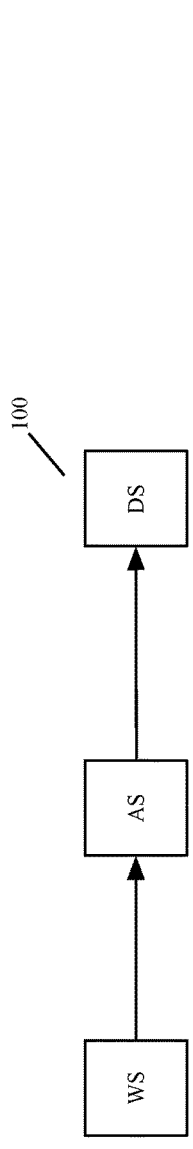
FIG. 1 illustrates a "3-tier-deployment" template.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention introduce cloud template awareness in the service policy framework. Some embodiments provide one or more service rule processing engines that natively support (1) template-specific dynamic groups and template-specific rules, and (2) dynamic security tag concepts. In some embodiments, a template provides a definition of one or more layers of data compute nodes (DCNs) for deployment. Templates are typically referred to as blueprints, such as the blueprints that can be deployed through VMware vSphere.

In some embodiments, the template-specified DCNs are servers (e.g., virtual machines or containers) that execute on host computers. Examples of such servers include webservers, application servers, database servers. In some embodiments, a DCN deployment template can include one or more middleboxes between the DCNs in the template. In some embodiments, deployment tools instantiate templates to define a multi-layer application deployment. The template instantiations are referred to below as template instances.

In some embodiments, templates determine machine attributes (e.g., DCN attributes), the manner in which the template components are provisioned, and the policy and management settings. A template typically defines the configuration needed to launch an application—including the application components (e.g., web server, application server, database server in a 3-Tier application deployment), the virtual machine (VM) or ISO images to be used for each of the application components, compute resources (e.g., number of CPUs, amount of random access memory, etc), storage resources (e.g., amount of disk space and type of disk storage), networking resources (e.g., static or dynamic IP addressing, as well as the VLANs to be connected to), etc. Examples of templates are further described in VMware vRealize Automation 6.2 Documentation Center available through the Internet. In this documentation, templates are referred to as blueprints.

As used in this document, a data message generically refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 2:
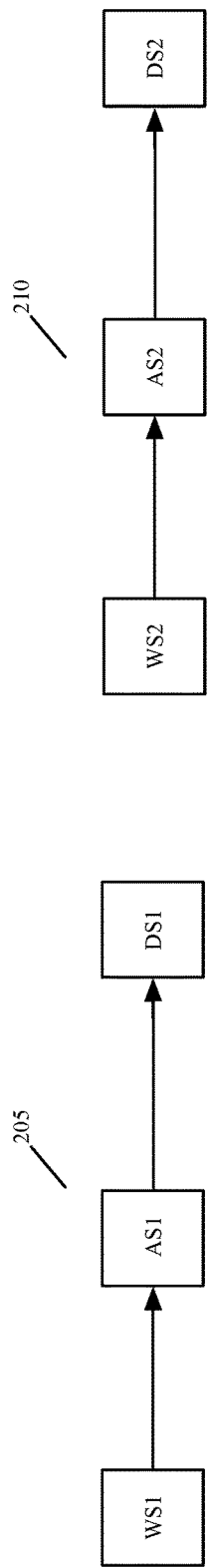
FIG. 2 illustrates two separate instances of the 3-tier deployment template of FIG. 1.

FIG. 1 illustrates a simple "3-tier-deployment" template that contains (1) a webserver (WS) tier that includes one or more webservers that provide web-based interface for the 3-tier deployment instance, (2) an application server (AS) tier that includes one or more application servers (appservers) that provide application services, and (3) a database server (DS) tier that includes one or more database servers that provide data storage operations. FIG. 2 illustrates two separate instances 205 and 210 of the 3-tier deployment template 100 of FIG. 1. In this example, the first instance 205 has webserver WS1, application server AS1, and database server DS1, while the second instance 210 has webserver WS2, application server AS2, and database server DS2.

The service rule processing engine of some embodiments natively supports template-specific dynamic groups and rules as it can directly process service rules that are defined in terms of dynamic groups and template/template instance identifiers. Examples of such services can include any kind of middlebox services, such as firewalls, load balancers, network address translators, intrusion detection systems, intrusion prevention systems, etc.

Figure 3:
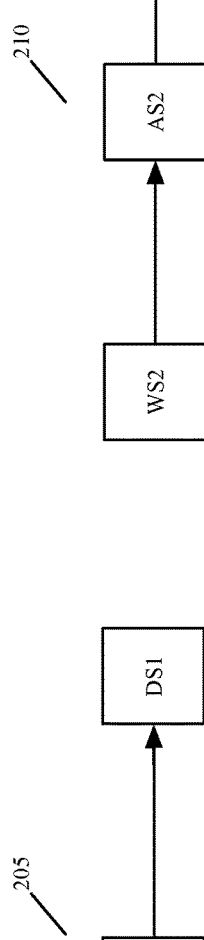
FIG. 3 illustrates an example of a firewall rule that is defined in terms of a template identifier and dynamic group identifiers.

FIG. 3 illustrates an example of a firewall rule that is defined in terms of a template identifier and dynamic group identifiers. This figure and many of the other examples provided below are related to firewall rules with native template support, and firewall engines that natively process such firewall rules. However, one of ordinary skill will realize that other embodiments use other service rules, which are defined in terms of template identifiers, template qualifying criteria and/or dynamic group identifiers, to perform other middlebox service operations (such as load balancing, network address translation, intrusion detection, intrusion prevention, etc.). These other embodiments have service processing engines (e.g., modules executing on host computers, or standalone service appliances) that natively process such service rules (that are defined in terms of template identifiers, template qualifying criteria and dynamic group identifiers).

In some embodiments, the firewall rule 300 of FIG. 3 is a firewall rule that is processed by a firewall engine in the data plane. This data-plane version of the firewall rule uses the webserver and appserver dynamic group identifiers to define its source and destination address identifiers 305 and 310, which are two of the qualifiers of the firewall rule (i.e., are two rule attributes that are to be compared to the parameters of a message that is to be processed). In processing a message, the firewall engine will determine whether the message's source and destination IP addresses are within the webserver dynamic group and appserver dynamic group respectively. When automated deployment tools deploy data compute nodes (e.g., virtual machines (VMs) or containers) on host computers, these tools in some embodiments dynamically associate the data compute nodes (DCNs) with tags that seamlessly associate the DCNs with dynamic groups. In this manner, the dynamic groups that are used to define firewall rules (e.g. are used to define the qualifier tuples of the firewall rules), can be dynamically modified when DCNs are instantiated on host computers in a datacenter. The dynamic tagging of DCNs and the seamless association of the DCNs with dynamic groups will be further described below.

For all deployed instances of a template, the firewall infrastructure of some embodiments (1) can specify one firewall rule that is defined in terms of one or more dynamically changeable dynamic groups, which, in turn, are associated with one or more components (e.g., DCNs), and (2) can deploy and process this firewall rule as is (with the dynamic group identifiers as rule qualifiers) in the data path. In addition to using dynamic groups for the source and destination qualifiers, the firewall rule 300 has a qualifier tuple 315 that specifies the template associated with this rule. In this example, the template identifier of qualifier 315 specifies 3TA, to identify that the rule is associated with the three-tier application template.

The use of security-group and template qualifiers in the firewall rules can have several benefits for the firewall infrastructure of some embodiments. First, a rule's use of the dynamic group qualifiers and its association with a template allows the firewall infrastructure of some embodiments to define just one version of a firewall rule for all instances of the template, i.e., to avoid the rule sprawl that results from defining multiple versions of the same firewall rule for multiple different instances of the same template.

Second, avoiding rule sprawl allows a network administrator to view a much smaller subset of the rules. For example, when ten instances of the template are deployed in a datacenter, and five firewall rules are defined for all instances of a template, the firewall infrastructure of some embodiments allows the network administrator to view five firewall rules that are defined for and deployed in the datacenter datapaths, instead of fifty rules.

Third, this firewall infrastructure of some embodiments allows a network administrator to define and view the rules in terms of high level constructs (e.g., high level dynamic groups) as they are deployed in the datapath. Fourth, because the firewall rules can be associated with the templates for which they are created, a network administrator can quickly search for all the firewall rules that are associated with a particular template, can easily review all the rules due to the smaller number of the rules, and can modify one identified firewall rule for all the template instances instead of numerous identical versions of the same rules that are defined for multiple different template instances.

The firewall rule structure of FIG. 3 is just one example of how some embodiments define a template-based firewall rule. Other embodiments use firewall rules with other rule structures. For instance, as further described below, the template-based firewall rules (1) have additional qualifiers, such as template instance match qualifiers for the source and destination address identifiers, and (2) allow the rule's template qualifier to be defined by reference to multiple templates. Other embodiments do not expressly recite template identifiers in the firewall rules, and instead rely on identifying a rule's associated template through other mechanisms, as described below.

Some embodiments support the notion of templates by inherently creating dynamic groups based on template names. Alternatively, or conjunctively, some embodiments define dynamic groups based on template instance identifiers and component roles. To define such dynamic groups, some embodiments automatically assign tags to the compute node components (e.g., webserver, appserver, database server, etc.) of the network when such components are instantiated, and then use these tags to associate the components with the dynamic groups.

Dynamic tags are standard constructs that are used in some VM deployments today to help mark and organize VM workloads into groups, such as dynamic groups. Hence, an administrator can create a tag based dynamic group and as the VMs are dynamically tagged at anytime within their lifetime, these VMs become members of this dynamic group. One very common example is the creation of the "Quarantine" tag group. As a VM is identified as being compromised, it is tagged with a dynamic "Quarantine" tag, which makes the VM a member of the quarantine dynamic group. As a result, all traffic from this VM is restricted by firewall rules for the firewall dynamic group until the detected condition is resolved. Once this condition is resolved, the Quarantine tag is removed from the VM, the VM is removed from the Quarantine dynamic group and the firewall rules associated with this dynamic group are no longer applied to the VM. However, the dynamic group based firewall rules to date are not defined in the datapath by reference to the dynamic group identifier, but by reference to IP addresses of the VMs in the dynamic groups.

To further elaborate on tag and dynamic group assignments, Table 1 illustrates three sets of tags that some embodiments assign to the components of the first and second template instances 205 and 210 of FIG. 2.

TABLE 1

| Application Component | Template | Template Instance | Application Component Role |
|---|---|---|---|
| WS1 | 3TA | 1 | WS |
| AS1 | 3TA | 1 | AS |
| DS1 | 3TA | 1 | DS |
| WS2 | 3TA | 2 | WS |
| AS2 | 3TA | 2 | AS |
| DS2 | 3TA | 2 | DS |

As template instances 205 and 210 are deployed with virtual machines (VMs) implementing webservers, appservers and database servers, (1) the webserver VMs are dynamically associated with WS tag, which seamlessly adds them as members of the webserver (WS) dynamic group, (2) the application server VMs are dynamically associated with AS tag, which seamlessly adds them as members of the appserver (AS) dynamic group, and (3) the database server VMs are dynamically associated with DS tag, which seamlessly adds them as members of the database server (DS) dynamic group.

As the VM automation tools instantiate template instance 1 (i.e., instantiate the components of this instance), the VMs of this instance are also associated with two other tags identified in Table 1. These two tags are the 3TA template tag and the instance 1 tag. Instead of associating these VMs with these two tags, other embodiments associate these VMs with one tag, which is "3TA.1," where 3TA reflects the 3 tier application deployment template and 1 reflects the instance. In either approach, all the VMs of the template instance 1 are placed in a dynamic group "3TA.1" in some embodiments. When the instance template 2 is instantiated, the VMs of this instance are similarly tagged with 3TA and the instance 2 tag, or with a tag 3TA.2.

Figure 4:
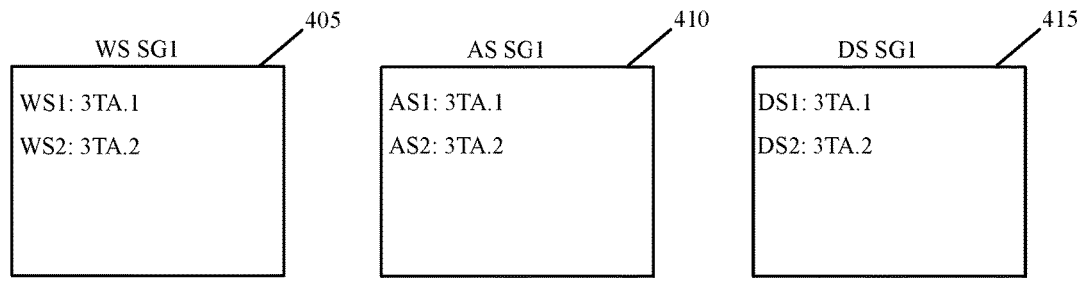
FIGS. 4 and 5 illustrate the dynamic groups that are defined based on the tags.
Figure 5:
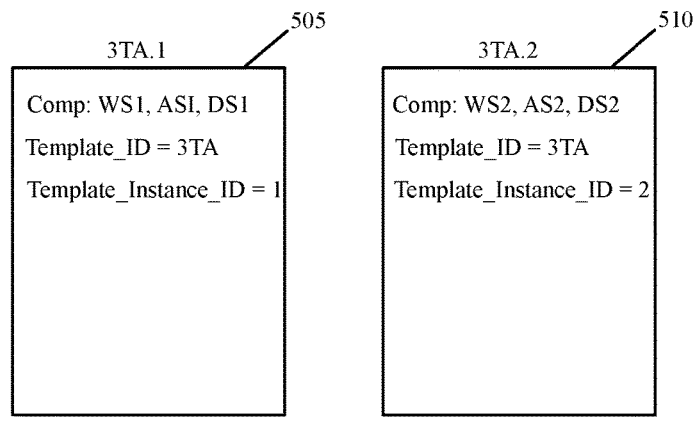

FIGS. 4 and 5 illustrate the dynamic groups that are defined based on the tags illustrated in Table 1 in some embodiments. FIG. 4 illustrates three server component dynamic groups 405, 410 and 415 that are created based on the application component role tags of Table 1, while FIG. 5 illustrates two dynamic groups 505 and 510 that are created for the two template instances, 3TA.1 and 3TA.2.

In FIG. 4, the three server component dynamic groups are the WS dynamic group 405, the AS dynamic group 410, and the DS dynamic group 415. This figure shows WS1 and WS2 as members of the WS dynamic group 405, AS1 and AS2 as members of the AS dynamic group 410, and DS1 and DS2 as members of the DS dynamic group 415. In some embodiments, the dynamic groups 405, 410, or 415 identify the server members (WS1, WS2, AS1, AS2, DS1, and DS2) in terms of their IP addresses. Other embodiments use other attributes of these servers to represent them in the dynamic groups 405, 410, or 415. Examples of such other attributes include VNIC (virtual network interface controller) identifiers, port identifiers, logical switch identifier, logical network identifier, tenant identifier, etc.

FIG. 4 also illustrates that the component dynamic groups 405, 410 and 415 specify a template instance identifier for each server member in the dynamic groups. Specifically, these dynamic groups specify template instance 3TA.1 as the template instance for servers WS1, AS1, and DS1, while identifying template instance 3TA.2 as the template instance for servers WS2, AS2, and DS2. In some embodiments, the template instance identifiers (3TA.1 and 3TA.2) in the component server groups 405, 410 and 415 refer to the template instance dynamic groups 505 or 510 of their respective sever members. In some embodiments, each template instance identifier is expressed in terms of the name of the template instance dynamic group. Other embodiments express the template instance identifiers differently. For example, some embodiments define the template instance identifiers as references (e.g., pointers) to the template instance dynamic groups.

In some embodiments, a firewall rule engine uses the template instance identifier in a component dynamic group to identify template instance attributes of a source or destination node, which the engine then uses to process a firewall rule. For instance, when checking a template-based firewall rule for a message, the firewall engine of some embodiments determines whether a source or destination IP address in a message's header belongs to a component dynamic group. If so, the firewall engine in some embodiments uses the template instance identifier that the matching component dynamic group specifies for the IP address to identify the template instance dynamic group to which the addressed source or destination node belongs.

The firewall engine then accesses the identified template instance dynamic group to retrieve template instance attributes of the message's source or destination node, and then uses these retrieved template instance attributes to further process the firewall rule. When the message's header attributes and/or template/dynamic group attributes match a firewall rule, the firewall engine determines that the message matches the firewall rule and then performs the firewall action as specified by the rule's firewall service parameter. In the example illustrated in FIG. 3, the firewall service parameter is specified by the action tuple 320. In this example, this action tuple specifies Allow, but for other rules it can specify Drop, or some other action (e.g., Redirect, etc.). This firewall rule and message processing will be described further below by reference to FIG. 13.

FIG. 5 illustrates the two dynamic groups 505 and 510 for the two template instances, 3TA.1 and 3TA.2. As shown, each instance's dynamic group 505 or 510 includes the list of member components, which for template instance 1 are WS1, AS1 and DS1, and for template instance 2 are WS2, AS2 and DS2. In some embodiments, the dynamic groups 505 and 510 identify the server members (WS1, WS2, AS1, AS2, DS1, and DS2) in terms of their IP addresses. Other embodiments use other attributes (VNICs, port identifiers, logical switch identifier, logical network identifier, tenant identifier, etc.) of these servers to represent them in the dynamic groups 505 and 510. As further shown, each instance's dynamic group 505 or 510 also includes a template identifier (3TA) and a template instance identifier (1 or 2). These two identifier attributes are used in some embodiments to resolve the firewall rule qualifiers. Several examples of such uses will be described further below.

In some embodiments, similar service rule structures and rule processing are used to perform other template-based and/or security-group based services natively. For instance, in some embodiments, the service rule engine tries to match a message's header attributes and/or template/security-group attributes to the qualifier (rule identifiers) of the service rules, and when it matches the message to a service rule, it then performs a service action on the message based on the matching service rule's service parameter(s). More specifically, when checking a template-based service rule for a message, the service engine of some embodiments determines whether a source or destination IP address in a message's header belongs to a component dynamic group. If so, the service engine in some embodiments uses the template instance identifier that the matching component dynamic group specifies for the IP address to identify the template instance dynamic group to which the addressed source or destination node belongs. The service engine then accesses the identified template instance dynamic group to retrieve template instance attributes of the message's source or destination node, and then uses these retrieved template instance attributes to further process the service rule. When the message's header attributes and/or template/dynamic group attributes match a service rule, the service engine determines that the message matches the service rule and then performs the service action as specified by the rule's service parameter or parameters.

Figure 6:
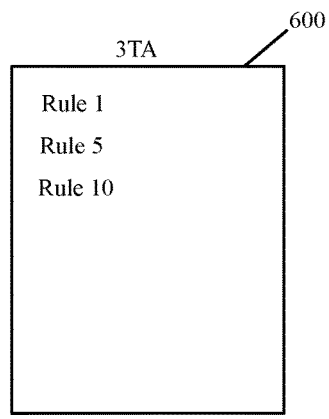
FIG. 6 illustrates an example of a template dynamic group for the 3TA template.

Some embodiments also define a dynamic group for each template that is used to deploy one or more template instances in a datacenter. FIG. 6 illustrates an example of a template dynamic group 600 for the 3TA template. As shown, some embodiments use a template's dynamic group to identify the firewall rules that are specified for template. As mentioned above, and further described below, some embodiments specify one set of firewall rules for all instances of a template. Because of this, some embodiments define a template dynamic group 600 to identify all the firewall rules that are specified for a template. Some of these embodiments use this dynamic group when all of the firewall rules specified for a template need to be identified and displayed.

Other embodiments do not define a template dynamic groups to identify firewall rules specified for a template, as they use other mechanisms to quickly identify firewall rules that are specified for the template. Also, while FIGS. 1-6 illustrate examples of a template and template instances that only include server components, one of ordinary skill will realize that the templates in some embodiments include non-DCN server components, such as middlebox elements. Examples of such middlebox elements include load balancing components (e.g., appliances, SVMs, etc.), firewall components (e.g., appliances, SVMs,) network address translators, etc. Accordingly, some embodiments associate tags with these middlebox elements and use these tags to group these other network elements into dynamic groups.

Figure 7:
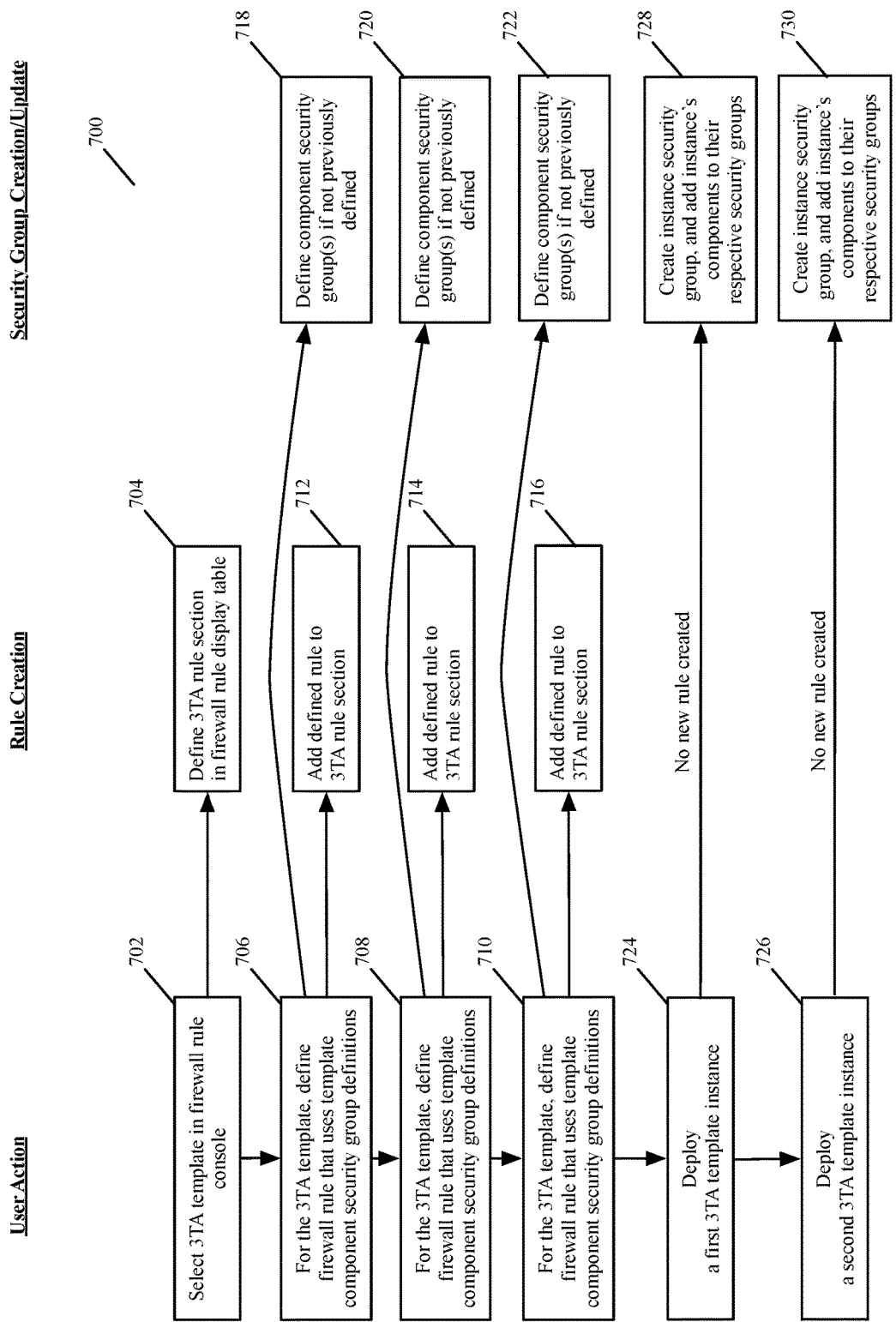
FIG. 7 presents a process that illustrates the creation of template-based firewall rules, template instances, and tag-based dynamic groups.

FIG. 7 presents a process 700 that illustrates the creation of template-based firewall rules, template instances, and tag-based dynamic groups. In some embodiments, this process is performed in a datacenter that includes numerous host computers that deploy several instances of one or more application templates. The datacenter in some of these embodiments also includes host computers that deploy servers that are not instances of any application template. As shown, the process 700 has three sets of operations, which are user-initiated operations, rule creation operations, and dynamic group creation/update operations. The process 700 presents only an exemplary set of operations. One of ordinary skill will realize that these operations can be performed in different order than the order depicted in FIG. 7.

As shown, the process 700 initially starts (at 702) when an administrator selects the 3TA template 100 in a firewall rule console, in order to start the process for specifying firewall rules for instances that are defined based on this template. One example of the firewall rule console will be described further below by reference to FIGS. 10-12. In response to this selection, the firewall rule framework creates (at 704) a 3TA section in a firewall rule display table that it provides to list all the firewall rules that are defined in the datacenter.

As further described below by reference to FIG. 10, the 3TA section in the firewall rule display table in some embodiments is one contiguous section that contains all the rules that the administrator defines for the 3TA template. In some embodiments, the administrator can move up or down this section as a whole in the firewall rule display table, but he cannot insert a rule that is not for the 3TA template in the middle of the 3TA template rules in this section. When the 3TA template section is moved up, the rules in this section are assigned a higher priority than the rules below this section in some embodiments. Conversely, when the 3TA template section is moved down, the rules in this section are assigned a lower priority than the rules above this section in some embodiments.

After selecting the 3TA template, the user defines (at 706, 708, and 710) three firewall rules for this template. Each of these rules is defined by reference to at least one template server component. For instance, the first rule might specify a destination address in terms of the template's webserver, the second rule might specify a source address in terms of the template's webserver and a destination address in terms of the template's application server, and the third rule might specify a source address in terms of the template's application server and a destination address in terms of the template's database server.

After each of these rules is defined, the rule is displayed (at 712, 714, and 716) in the 3TA template section of the firewall rule display table. In some embodiments, the order of the rules in this section specify their priority level compared to other rules in this section, with the higher priority rules appearing earlier in this section (e.g., on top of this section). When a rule is defined that refers to a server component of a template for which no dynamic group has yet been defined, the process 700 creates a dynamic group for the server component. Thus, FIG. 7 illustrates that in response to the rule-addition operation 706, 708 or 710, one or more dynamic groups are defined (at 718, 720 or 722) when the created rule defines it source or destination address in terms of a component server for which no dynamic group has been previously defined. When a dynamic group has been previously defined for the server component that is used in the rule, the process does not need to create another dynamic group for the component again.

As mentioned above, in one example the first rule (defined at 706) specifies a webserver in its destination address tuple, the second rule (defined at 708) specifies a webserver and an application server as the source and destination address tuples, and the third rule (defined at 710) specifies the application server and the database sever as the source and destination address tuples. For this example, the process would define a webserver dynamic group at 718, would define an application server dynamic group at 720, and would define a database server dynamic group at 722.

After defining the three rules, the user deploys (at 724 and 726) two instances of the 3TA template. In some embodiments, each of these deployments entails directing the VM management tools to deploy a webserver, an application server and a database server on one or more host computers. As shown, no new rules are created after either of these instances is deployed. This is because the rules are defined for the templates and not the template instances in some embodiments. This approach avoids rule sprawl and makes it easier to view and modify all rules related to a particular template.

The deployment of each instance just results (at 728 and 730) in (1) the addition of the instance's server components to their respective server component dynamic groups, (2) the creation of a dynamic group for the instance, and (3) the creation of the data records in the template instance dynamic groups. After 730, the created server component dynamic groups appear as the dynamic groups 405, 410 and 415 of FIG. 4 in some embodiments. Also, in some embodiments, the template instance dynamic groups after 730 appear as dynamic groups 505 and 510 of FIG. 5.

As mentioned above, some embodiments create a template dynamic group 600 for each template. For these embodiments, the process 700 creates a template dynamic group in response to the addition of the 3TA section to the firewall rule display table. Each time a rule is defined for this section, the process 700 then adds an identifier for this rule to the template dynamic group.

FIG. 8 illustrates a 3TA firewall rule 800 section of a firewall table of some embodiments. This firewall rule section allows firewall rules to be defined by reference to high-level constructs (webserver, appserver, database server dynamic groups, etc.) that are familiar to the administrators. By using these high level constructs, an administrator can easily define rules in the 3TA firewall section that ensure inter-instance isolation and component-level intra-instance isolation.

In the example illustrated in FIG. 8, the firewall rule section displays five firewall rules 802-810 that an administrator defines for a 3TA template in some embodiments. Like the rule 300 of FIG. 3, the rules 802-810 use dynamic group identifiers to define source and destination address tuples. Specifically, the webserver dynamic group 405 is specified for the destination address tuple 814 of the first rule 802, and is specified for the source address tuple 812 of the second rule 804. The appserver dynamic group 410 is specified for the destination address tuple 814 of the second rule 804, and is specified for the source address tuple 812 of the third rule 806. The database dynamic group 415 is specified for the destination address tuple 814 of the third rule 806.

The dynamic group references for the source or destination address tuples in the first three rules provide match criteria that specify that a processed message's addressed source or destination node is a node that is a component of one of these 3TA component dynamic groups 405, 410 and 415. In some embodiments, firewall engine determines whether the source or destination IP address in a message's header is within the dynamic group identified by the source or destination address tuple of a firewall rule when it compares the message's attributes with the firewall rule's qualifiers (rule identifiers) as it is processing the message. In other embodiments, the firewall engine compares other attributes of the message's addressed source or destination nodes with similar attributes of the servers in the server component dynamic groups 405, 410 and 415.

The fourth rule 808 specifies 3TA for the source and destination tuples, which means that the source or destination node of the message in questions should be part of the 3TA template, but the actual template instance to which it belongs does not really matter. Different embodiments perform this comparison differently. Some embodiments perform this comparison based on a message's source and destination IP address. For instance, some embodiments define a 3TA dynamic group (like 3TA dynamic group 600) in which they store the IP addresses of all component nodes that are deployed in instances of the 3TA template.

Instead of creating such a template dynamic group, other embodiments have the firewall engines create runtime data structures to store the template information, and then use such data structures to process the template matching criteria of firewall rules. For instance, in some embodiments, on receiving any dynamic group which has the attribute identifier "TemplateName" (e.g., Template_ID=3TA), the firewall engine creates a trie mapping structure to map the Template Name to the dynamic groups and addresses which belong to it. When there are N template instances spawned, the firewall rule engine would get N dynamic group instances with the following attribute:

Template_ID=3TA
Template_Instance_Id=<1..10>

The firewall engine would flatten all the addresses in these N dynamic groups (e.g., in a radix tree) and for each address, attach the template name to which those addresses belong. With this structure, the firewall engine processes a template match criterion for a message by looking up the source or destination address in the constructed tree to get the template name.

The fifth rule specifies "Any Template" for its source and destination tuples. These tuples define a template match condition that means that the source or destination node of the message in questions should be part of a template, but the actual template it belongs to does not really matter. Like the template matching criteria of rule 808, different embodiments perform the template matching criteria of rule 810 differently. For instance, to resolves the "Any Template" matching criteria, some embodiments create a template dynamic group that lists identifiers of component nodes in any instance of any template. Other embodiments use the trie/radix structures described above. Once a firewall engine in these embodiments finds a source or destination IP address as a node in such a structure that has an associated template name, then the firewall engine determines that the message's source or destination satisfies the "Any Template" criteria of the fifth rule 810.

Like the rule 300, the rules 802-810 have a template identifier 824 that identifies the template associated with the rule. In some embodiments, this identifier can only specify one template for one rule, while in other embodiments, this identifier can specify more than one template. Unlike the rule 300, the rules 802-810 also include a template-instance match identifier 822 that specifies whether the source and destination nodes addressed by a message have to belong to the same template instance.

Using these tag-based dynamic groups, template identifiers, and template-instance match identifiers, the firewall rules 802-810 serve as a small set of rules that concisely capture the following firewall policies for all instances of the 3TA template.

1. Any external client can talk to a webserver of any instance of the 3-tier-deployment template;
2. A webserver of a specific instance of the 3TA template can only communicate to the application server of the same instance on a specific protocol/port;
3. An application server of a specific instance of the 3TA template can only communicate to the database server of the same instance on a specific protocol/port;
4. No intra-deployment instance communication is allowed unless explicitly permitted as mentioned in (2) and (3) above; and
5. No inter-template instance communication permitted.

In FIG. 8, the second and third rules 804 and 806 provide examples of how some embodiments allow a firewall rule to be defined to prohibit inter-instance communication (i.e., to achieve instance isolation). As shown by these rules, some embodiments support instance isolation by allowing a condition match condition to be specified in terms of the template instance match identifier 822.

In the data path, once the addressed source and destination nodes of a message are identified to belong to the 3TA component dynamic group, an additional check is done to make sure that the instance value for the addressed source and the destination nodes belong to the same instance. Typically, while the number of templates is limited (e.g., tens or low hundreds), the number of instances based on the templates is quite large (e.g., hundreds and even thousands). Modeling instance isolation criteria as a match criteria, and not as an explicit dynamic group, is advantageous from a scalability issues.

Template instances created using different templates can have overlapping addresses. Some embodiments address this critical template isolation need of preventing one template policy from impacting security policies for another template, by using template identifier 824, which limits the scope of the rule from global to specific applications. In some embodiments, all the relevant data (including dynamic groups) is kept under the context of the template section. This can be done by assigning template identifier 824 on the dynamic groups created for the instance to only the template section. In some embodiments, all the rules created in the scope of a particular template have the template's identifier applied to them as they are part of the inherently created template dynamic group.

Some embodiments use other techniques to address template isolation needs that may arise by overlapping IP addresses. For instance, some embodiments obtain the template instance identifier from more unique identifiers, such as logical switch identifiers, or other network identifiers that will not be duplicated or have a much lower chance of being duplicated.

The example illustrated in FIG. 8 reduces rule and dynamic group overload, rule and dynamic group churn, and rule management complexity. It reduces rule overload because it does not generate a new rule each time a new instance of a template is created, as described above by reference to FIG. 7. It avoids rule and dynamic group churn because only the newly created components get updated with the right dynamic tags at the time of template instantiation. Also, its simplifies rule management because the firewall administrators do not need to manage the firewall rules and rule tables that grow into hundreds of tables and thousands of rules.

Figure 9:
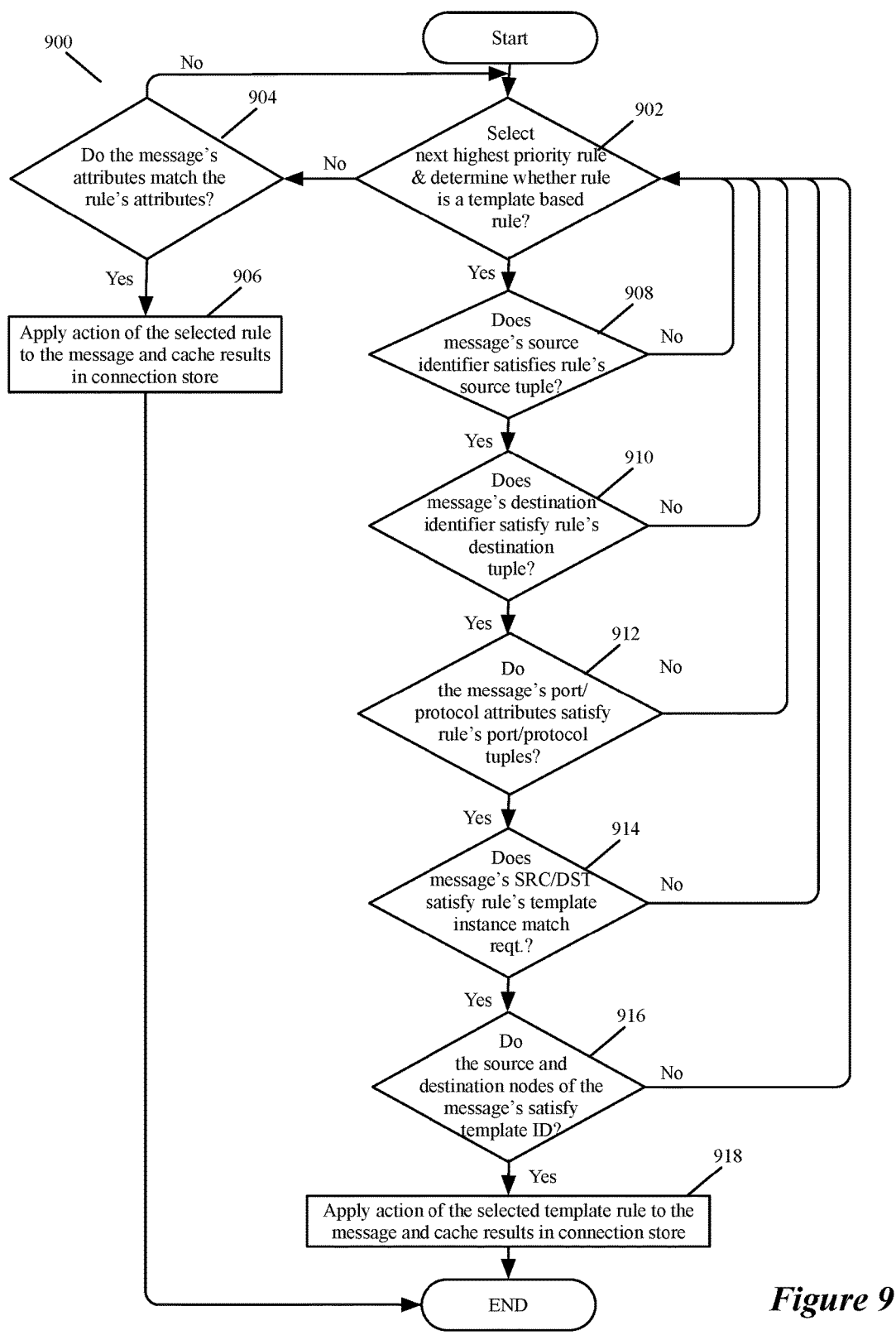
FIG. 9 illustrates a process that a firewall node performs in some embodiments to process template-based firewall rules for data messages that it receives.

FIG. 9 illustrates a process 900 that a firewall node performs in some embodiments to process template-based firewall rules for data messages that it receives. In some embodiments, the firewall node can be a firewall module that executes on a host machine along with a plurality of data compute nodes that are sources or destinations of the data messages processed by the firewall module. In these or other embodiments, the firewall node can also be a standalone firewall appliance.

The process 900 is part of the data plane operations that the firewall node performs in some embodiments. Before performing this process 900, the firewall node of some embodiments receives from network controllers (e.g., servers that define data for managing and configuring forwarding elements and middleboxes) the template-based firewall rules and dynamic group definitions through control channel communication.

The process 900 starts each time the firewall node receives a data message that it cannot process based on firewall state that it previously generated by processing another data message in the same message flow as the received message. As described below, each time the firewall node identifies a firewall rule that matches a received message and it performs the rule's action for the message, the firewall node stores the action along with the message's header values in a connection storage. Each time the firewall node receives a new data message, it first checks its connection storage to determine whether it has processed one or more messages from the same flow so that it can thereby process the received message based on an action it previously cached for this flow. In this scheme, the firewall node uses the process 900 for a message only when the connection storage does not have a record that matches the message.

At 902, the process selects the highest priority firewall rule in a firewall rule storage and determines whether this rule is a template-based firewall rule. In some embodiments, the firewall node stores the firewall rules in the firewall rule storage according to priority values. In some of these embodiments, the priority of the rules coincides with their order in the storage structure (e.g., rule list), with higher priority rules appearing earlier in the structure (e.g., in the list) than lower priority rules.

In different embodiments, the process determines whether a rule is a template-based rule or is not a template-based rule differently. In some embodiments, the process makes this determination by determining whether the rule has a template identifier that specifies a particular template. When the rule has no template identifier or has a template identifier (e.g., null set) that specifies that the rule is not associated with any template, the process 900 transitions to 904 to perform traditional firewall rule processing for this message.

Specifically, at 904, the process determines whether the received message's header attributes match the selected rule's qualifier attributes (also called rule identifying attributes). As mentioned above, each firewall rule in some embodiments specifies (1) an action and (2) a set of qualifier attributes, which are rule identifying attributes that are meant to be matched with message header attributes in order to determine whether a rule matches a message. In some embodiments, the qualifier attributes of the non-template based firewall rules are the five tuple identifiers, which are source IP address, destination IP address, source port, destination port and protocol. In these or other embodiments, other qualifier attributes can be used for one or more non-template based firewall rules. Examples of such other qualifier attributes include layer 2 header values.

When the process determines (at 904) that the received message's header attributes matches the selected rule's qualifier attributes, the process (at 906) performs the action of this rule on the data message, stores in the connection storage a record to identify this action for the message's header values (which are also its flow identifying attributes), and then ends. In some embodiments, the action of the firewall rule can be any of the traditional firewall rule actions, such as Allow, Deny, Redirect, etc. As mentioned above, the process stores (at 906) a record in the connection storage after identifying a firewall rule for the received data message so that it can use this record to process subsequent data messages that are part of the same message flow as the received data message that it matched to the firewall rule.

On the other hand, when the process determines (at 904) that the received message's header attributes do not match the selected rule's qualifier attributes, the process returns to 902 to select the next highest priority rule and to determine whether this newly selected rule is a template-based rule. When the process determines (at 902) that a selected rule is a template-based rule, the process performs one or more matching operations 908-916 to determine whether the data message's attributes match qualifier attributes of the template-based firewall rule. In some embodiments, the process performs these matching operations in a different sequence than that illustrated in FIG. 9.

At 908, the process determines whether the message's source identifier matches the rule's source tuple qualifier. In the discussion below, the message's source identifier is the message's IP address. One of ordinary skill will realize that other embodiments use other source identifiers for the message. When the rule's source tuple qualifier expressly specifies an IP address or a set of IP addresses, the process 900 in some embodiments determines (at 908) whether the message's source IP address matches an IP address specified by the rule's source tuple qualifier. However, as mentioned above, a firewall rule's source tuple qualifier can be also defined by reference to a dynamic group, such as a server component dynamic group (e.g., dynamic group 405, 410, or 415). In such a case, the process determines (at 908) whether the message's source IP address is a member of the dynamic group specified by the source tuple qualifier of the rule. If so, the message's source identifier matches the rule's source tuple qualifier.

When the message's source identifier does not match the rule's source tuple qualifier, the process transitions back to 902 to select the next highest priority rule and to determine whether this rule is a template based rule. On the other hand, when the message's source identifier matches the rule's source tuple qualifier, the process determines (at 910)

whether the message's destination identifier matches the rule's destination tuple qualifier. In the discussion below, the message's destination identifier is the message's IP address. One of ordinary skill will realize that other embodiments use other destination identifiers for the message.

When the rule's destination tuple qualifier expressly specifies an IP address or a set of IP addresses, the process 900 in some embodiments determines (at 910) whether the message's destination IP address matches an IP address specified by the rule's destination tuple qualifier. However, as mentioned above, a firewall rule's destination tuple qualifier can be also defined by reference to a dynamic group, such as a server component dynamic group (e.g., a dynamic group 405, 410, or 415). In such a case, the process determines (at 910) whether the message's destination IP address is a member of the dynamic group specified by the destination tuple qualifier of the rule. If so, the message's destination identifier matches the rule's destination tuple qualifier.

When the message's destination identifier does not match the rule's destination tuple qualifier, the process transitions back to 902 to select the next highest priority rule and to determine whether this rule is a template based rule. On the other hand, when the message's destination identifier matches the rule's destination tuple qualifier, the process determines (at 912) whether the message's port and/or protocol identifiers match the rule's port/protocol tuple qualifier(s). In the discussion below, the message's port/protocol identifiers include the message's source and destination ports and message's protocol. One of ordinary skill will realize that other embodiments use other such identifiers for the message, or do not use any port and/or protocol identifiers.

When the message's port and/or protocol identifiers do not match the rule's port/protocol tuple qualifier(s), the process transitions back to 902 to select the next highest priority rule and to determine whether this rule is a template based rule. On the other hand, when the message's port and/or protocol identifiers match the rule's port/protocol tuple qualifier(s), the process determines (at 914) whether the source and destination nodes addressed in the message satisfy any template instance match criteria that the rule may optionally specify.

As described above by reference to FIG. 8, some embodiments provide an explicit template-based rule attribute 822 that allows an administrator to require the source and destination nodes of a data message to belong to the same template instance. As further described above by reference to FIGS. 4, 5, and 8, the source or destination node's template instance can be identified from the component dynamic group (e.g., a dynamic group 405, 410, or 415) that is matched to the source or destination IP (at 908 or 910).

Accordingly, once the process 900 finds the message's source or destination IP address in the component dynamic group, it then identifies the template instance dynamic group that the component dynamic group specifies for this source or destination IP address. From the identified template instance dynamic groups that it identifies for the source and destination nodes, the process then retrieves (at 914) template instance identifiers of the message's source and destination nodes, and then determines (at 914) whether these two template instance identifiers satisfy the rule's template instance match criteria (e.g., whether these two identifiers match in case that the match criteria requires them to match). When these two identifiers do not satisfy the rule's template instance match criteria, the process transitions back to 902 to select the next highest priority rule and to determine whether this rule is a template based rule.

On the other hand, when these two identifiers satisfy the rule's template instance match criteria, the process determines (at 916) whether the source and destination nodes addressed in the message satisfy the rule's template identity qualifier 824. As described above by reference to FIGS. 4, 5, and 8, the source or destination node's template can be identified from the server component dynamic group that is matched to the source or destination IP (at 908 or 910). Specifically, once the process 900 finds the message's source or destination IP address in the dynamic group, it can retrieve the template identifier for the source or destination IP address from the template instance that the dynamic group identifies for the source or destination IP address. The process can then use the retrieved template identifiers for the source and destination to determine (at 916) whether the retrieved identifiers match the rule's specified template identifier. When these retrieved identifiers do not match the rule's template identifier, the process transitions back to 902 to select the next highest priority rule and to determine whether this rule is a template based rule.

On the other hand, when the template identifiers match, the process (at 918) performs the action of the rule on the data message, stores in the connection storage a record to identify this action for the message's header values (which are also its flow identifying attributes), and then ends. In some embodiments, the action of the firewall rule can be any of the traditional firewall rule actions, such as Allow, Deny, Redirect, etc. As mentioned above, the process stores (at 918) a record in the connection storage after identifying a firewall rule for the received data message so that it can use this record to process subsequent data messages that are part of the same message flow as the received data message that it matched to the firewall rule.

Figure 12:
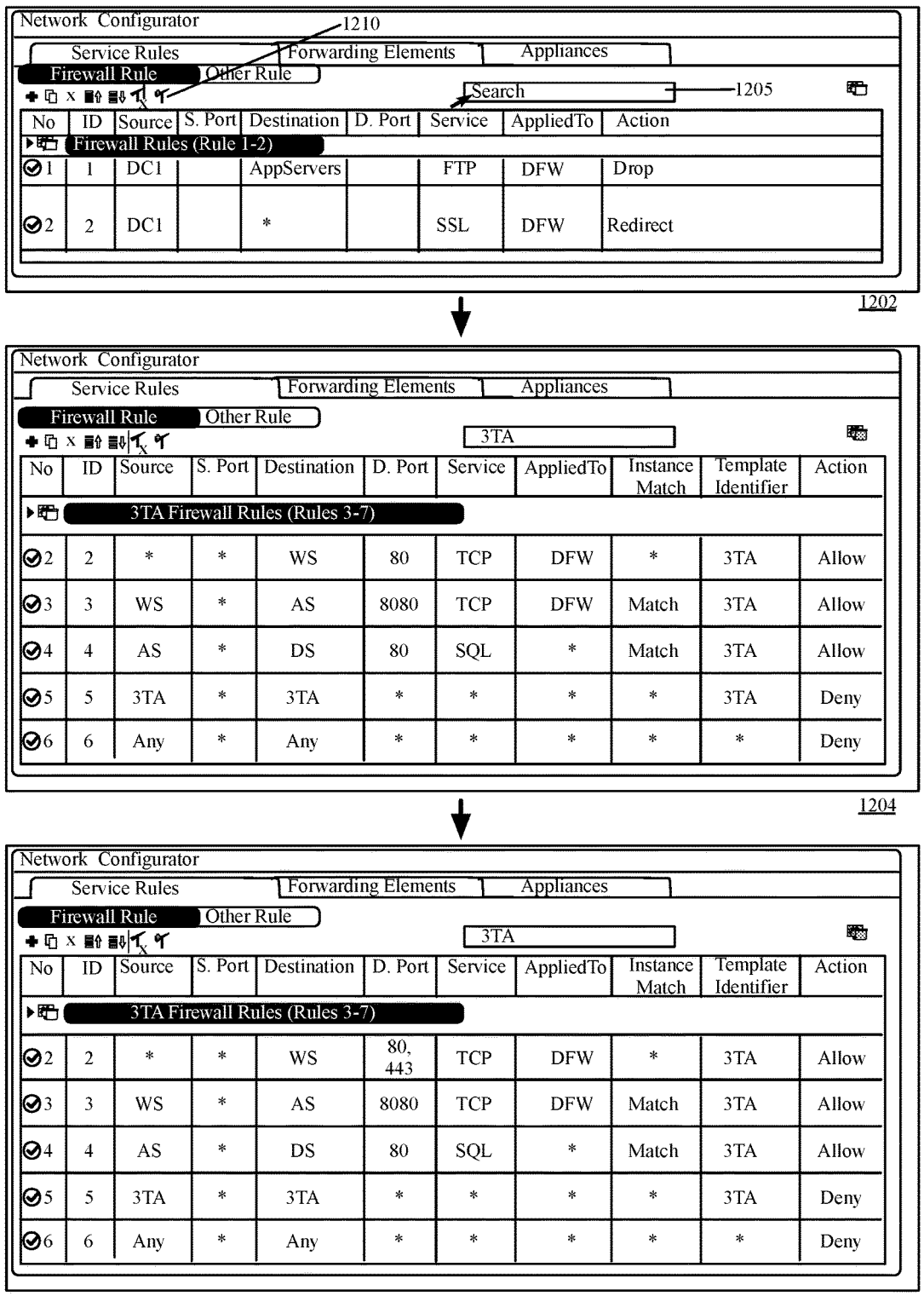

The firewall rule console of some embodiments will now be described by reference to FIGS. 10-12. FIG. 10 illustrates an example of the user interface of a service rule management console 1000 that a network controller set provides in some embodiments in order to allow an administrator to specify firewall rules, including template-based firewall rules. As shown, the service rule console in some embodiments is part of a network configurator console (i.e., is one tab in a series of tabs in the network configurator console) that also allows an administrator to manage other network elements, such as managed forwarding elements, gateways, top-of-rack switches, etc. In other embodiments, this service rule management console 1000 is a standalone interface, or is part of another datacenter management interface.

Figure 10:
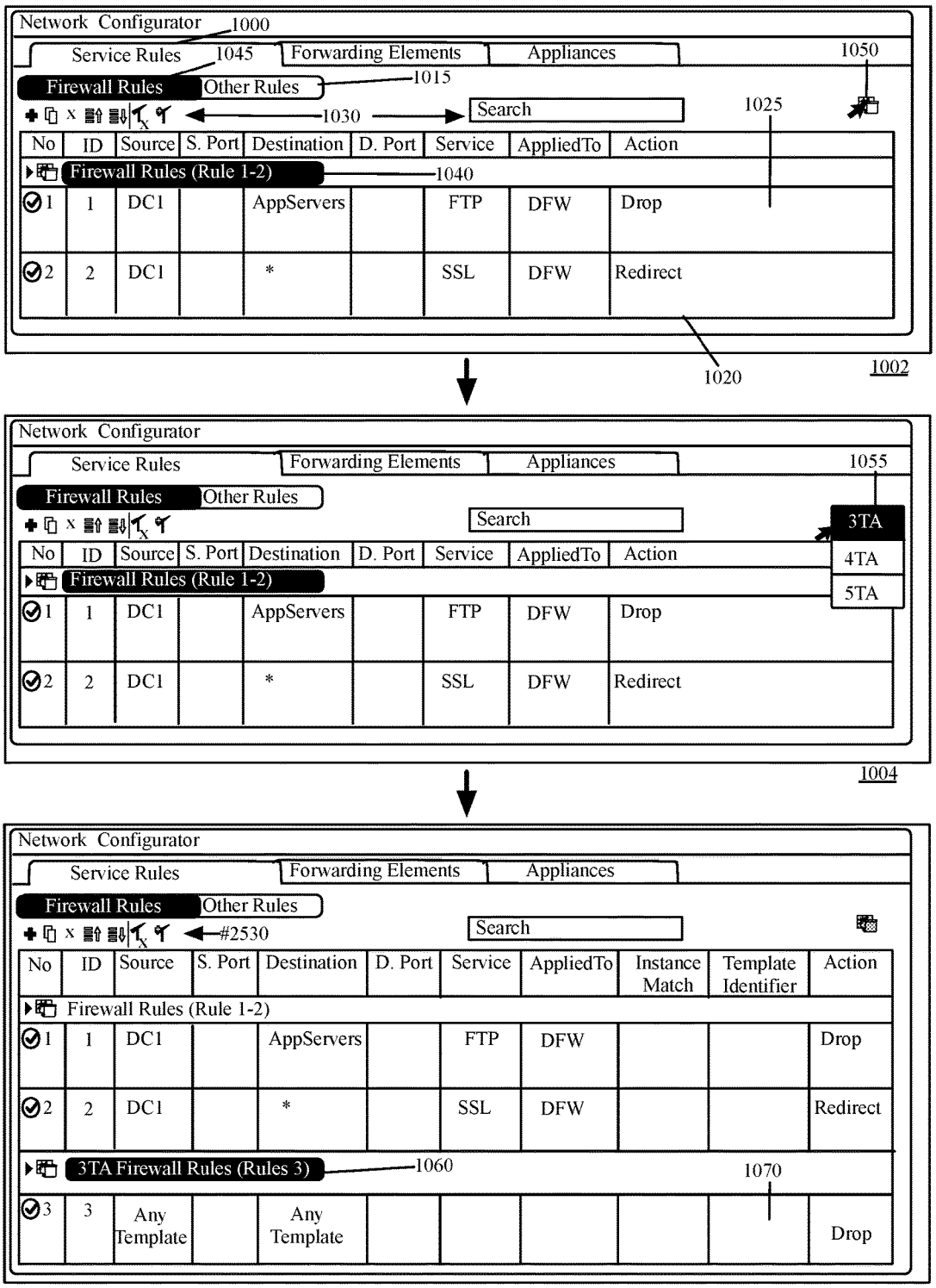

In FIG. 10, the example illustrated in three operational stages 1002, 1004, and 1006. The first stage 1002 illustrates the service rule management (SR) console 1000 through which service rules can be defined for one or more services, such as firewall rules, load balancing rules, etc. As shown, the SR management console 1000 has a service tab section 1015 and a rule section 1020. The service tab section 1015 has multiple tabs for multiple types of service. In this example, the service tab 1045 for the firewall rules has been selected.

Whenever one of the service tabs is selected in the service tab section 1015, the console 1000 displays the rule section 1020 for the service type associated with the selected service tab. As shown, the rule section 1020 displays a rule list 1025 and several UI controls 1030. In the first stage 1002, the rule list 1025 displays two firewall rules, and the UI controls 1030 relate to firewall rules, as the firewall service tab 1045 has been selected in the service tab section 1015.

In some embodiments, these UI controls 1030 includes (1) controls for adding firewall rules, (2) copying firewall rules, (3) deleting firewall rules, (4) moving firewall rules up and down in the rule section list being displayed, (5) applying filters to filter out rules in the rule section list that do not meet one or more filtering criteria, (6) removing filters, and (7) searching for firewall rules that meet certain criteria. In some embodiments, moving a firewall rule up or down on the rule list makes the firewall rule have a higher priority or a lower priority than the firewall rules below or above the moved rule. These controls are further described in U.S. patent application Ser. No. 14/788,689, filed on Jun. 30, 2015, now issued as U.S. Pat. No. 9,787,641, which is incorporated herein by reference.

The two displayed firewall rules are part of a default firewall rule sub-section 1040 of the rule section 1020. In some embodiments, these rules are defined for the entire datacenter. These rules are defined in terms of traditional firewall rule identifiers (e.g., the five-tuple rule identifiers for L3 firewall rules). Specifically, as shown in the first stage 1002, each firewall rule in the default rule section 1040 of the rule list 1025 can be defined in terms of one or more types of tuples, which include source address tuple, destination address tuple, source port tuple, destination port tuple and service (protocol) tuple. A firewall rule can be defined in terms of just one of these tuple types, or in terms of several of these tuple types. As shown, each rule also has an action tuple and an AppliedTo tuple, which will be described below.

In some embodiments, the source and destination address and port tuples can be used to specify source and destination header values of data messages for which the firewall node processes the firewall rules. In other words, the firewall rule identifiers can be defined in terms of source and destination header values of data messages. For L3/L4 firewall rules, the source and destination header values can specified in terms of IP addresses and/or port values (e.g., TCP, UDP, or other L4 port values). For Ethernet firewall rules, the source and destination header values can be specified in terms of the data message L2 parameter values, such as MAC addresses, etc.

In some embodiments, the service tuple can be used to define service protocols that the data messages use. In other words, the firewall rule identifiers can be defined not only in terms of source and destination header values of data messages, but also the service protocols specified in the data message headers. As shown, the rule list 1025 allows the source, destination and service tuples to be defined at various level of granularity because this console is supported by a backend engine that resolves higher level tuple values (e.g., datacenter (DC1, DC2), compute cluster, server type (Webservers, AppServers, etc.), logical switch, logical router, higher level service constructs) into lower level values (e.g., IP addresses, MAC addresses, service protocol names, etc.). However, as further described below, this backend engine in some embodiments does not translate the high-level dynamic group identifiers in the template-based firewall rules to lower level values (e.g., IP addresses, etc.) as the firewall engines of these embodiments can process in the data plane the template-based firewall rules with these dynamic group identifiers.

The action tuple of each firewall rule specifies the action to perform with respect to a data message that has header values that match the rule's message matching tuples (e.g., the source, destination and service tuples). Examples of action tuple values include Allow, Deny (also called Drop or Block), Redirect, etc. The AppliedTo tuple of each firewall rule allows a set of firewall enforcement points in the network to be defined for the rule. Examples of such enforcement points include host-level firewall engines (referred to as distributed firewalls, DFWs) and perimeter firewall devices (e.g., firewall appliances). Like the source, destination and service data tuples, the AppliedTo tuple in some embodiments can be defined in terms of high or low level constructs, as the firewall management console's back-end engine resolves the high level constructs to lower level constructs.

As shown, the firewall rule console also includes a template-based firewall control 1050 for adding template-based firewall rules for one or more templates. The first stage 1002 shows the selection of this control 1050 through a cursor click operation. The second stage 1004 shows that in response to this selection, the service rule console 1000 opens a window 1055 that displays several different templates. The second stage 1004 shows the selection of the 3TA template through a cursor click operation. This stage also shows the window 1055 displaying 4TA and 5TA for a four-tier application template and a five-tier application template.

The third stage 1006 shows that in response to this selection, the firewall rules framework of the network controller set adds a 3TA template firewall rule sub-section 1060 to the firewall rule section 1020. In some embodiments, this section will contain all the firewall rules that are defined for the 3TA template. In some embodiments, the firewall rules in this section are meant to be applied to incoming and outgoing traffic on ingress to and egress from each logical network connecting the compute nodes of each 3TA template instance, and on the intra-instance traffic between the compute nodes of each 3TA template instance. The third stage 1006 shows one default rule 1070 that the firewall framework adds to the 3TA firewall rule sub-section 1060 upon the addition of this sub-section to the firewall rule section 1020.

In some embodiments, the firewall rules in a template's rule sub-section in the firewall rule section 1020 are one contiguous set of rules. Specifically, in these embodiments, a firewall rule that is not part of a template cannot be inserted in between the firewall rules that are defined for the template in that template's rule sub-section (e.g., 3TA rule sub-section 1060) in the firewall rule section 1020.

FIG. 11 illustrates this point in two stages 1102 and 1104. The first stage 1102 illustrates five firewall rules that are defined in the 3TA template section 1060. These five firewall rules are the same rules that were described above by reference to FIG. 8. The first sage 1102 also illustrates the selection of the move-up control 1110 (through a cursor click operation) while the 3TA firewall rule section 1060 is selected. The second stage 1104 shows that in response to this selection, the second rule 1112 in the default firewall rule section 1040 is demoted to have a lower priority than all the 3TA template rules. Prior to this operation, the second rule 1112 had a higher priority than all of the 3TA template rules. In getting demoted, the second rule was not inserted after the first rule 1114 in the 3TA rule sub-section 1060, because a firewall rule that is not a 3TA template based firewall rule cannot be inserted in the 3TA rule sub-section 1060.

When multiple different templates are used to deploy application server instances in a datacenter, the service rule console can be used to specify firewall rules for the different templates (e.g., for 3TA, 4TA, and 5TA templates). In this case, the firewall rule section 1020 will contain multiple template-based firewall rule sub-sections 1060 for multiple templates (e.g., template based firewall rule sub-sections for 3TA, 4TA, and 5TA templates), with each template's subsection serving as one contiguous sub-section for containing all the firewall rules associated with the template. Like the rules in the template sub-section 1060, the rules in the firewall rule sub-section of each of the other templates move up or down in unison as no firewall rule that is not associated with their template can be placed within their template's firewall rule sub-section. However, non-template-based firewall rules can be defined between two firewall rule sub-sections for two templates.

As described above, having firewall rules associated with their respective templates has many advantages. FIG. 12 illustrates some of these advantages. Specifically, this figure illustrates that the template-based approach makes it easier to search for template-based firewall rules, to view these rules, and to modify these rules. This figure illustrates these benefits in three stages 1202-1206.

The first stage 1202 shows the cursor selection of the search field 1205, which is one of the UI controls 1030 of the firewall rule section 1020. The second stage shows the rule section 1020 displaying only 3TA template firewall rules after the user has entered 3TA in the search field. This search causes the firewall rule console to filter out the rules in the rule list 1025 to display only 3TA template firewall rules.

In some embodiments, the user can also direct the firewall rule console to filter out all the rules except the rules for a particular template (e.g., the 3TA template) by selecting the filter control 1210 of the UI control 1030. This filter control in some embodiments presents a window (not shown) that lists a plurality of attributes that can be individually or in combination be selected to define a single-attribute or multi-attribute filter for filtering out rules. For a selected attribute, a user can specify one or more values. In some embodiments, one of the attributes in the presented filter window is a template attribute. The user can select this attribute and specify one or more templates for which he wants to view the rules. Once the user defines the template for the template attribute, and selects the filter command, the firewall rule list displays that template's firewall rules.

The second stage 1204 shows the five rules that are specified for the 3TA template. These five rules are the only five rules that are specified for all instances of this template. These five rules are also the only five rules that are used at each firewall node for all instances of the 3TA template. Viewing just these five rules is much easier than the viewing 5*N rules for N instances of the 3TA template, which is the number of rules that current approaches define for N instances of a five rule template. Viewing a smaller set of rules makes it much easier to get a quick, comprehensive view of all the rules affecting all the instances of a template.

Viewing the smaller set also makes it easier to modify, add or delete rules. The third stage 1206 shows the 3TA template rule set after the user has edited one of the rules. Specifically, this stage shows the first rule modified to specify port 443 in addition to port 80 in its destination port tuple. Because this rule is applicable for all instances of the 3TA template, the change to this qualifier tuple of this rule is applicable to all instances of the 3TA template. Similarly, if the administrator added or deleted a firewall rule in the third stage 1206, this addition or deletion would be applicable to all instances of the 3TA template.

Additions, deletions or changes to a template's firewall rules are propagated to the firewall nodes that enforce the template's firewall rules for one or more of the instances of the template. Given that the number of additions, deletions, or changes is limited as they are applied to just one set of template rules and not N sets for N groups of template instance rules, the propagation of additions, deletions and changes to the template's firewall rules consumes much less resources (computation, bandwidth, etc.) than current rule propagation, which propagates N times as much data.

Figure 13:
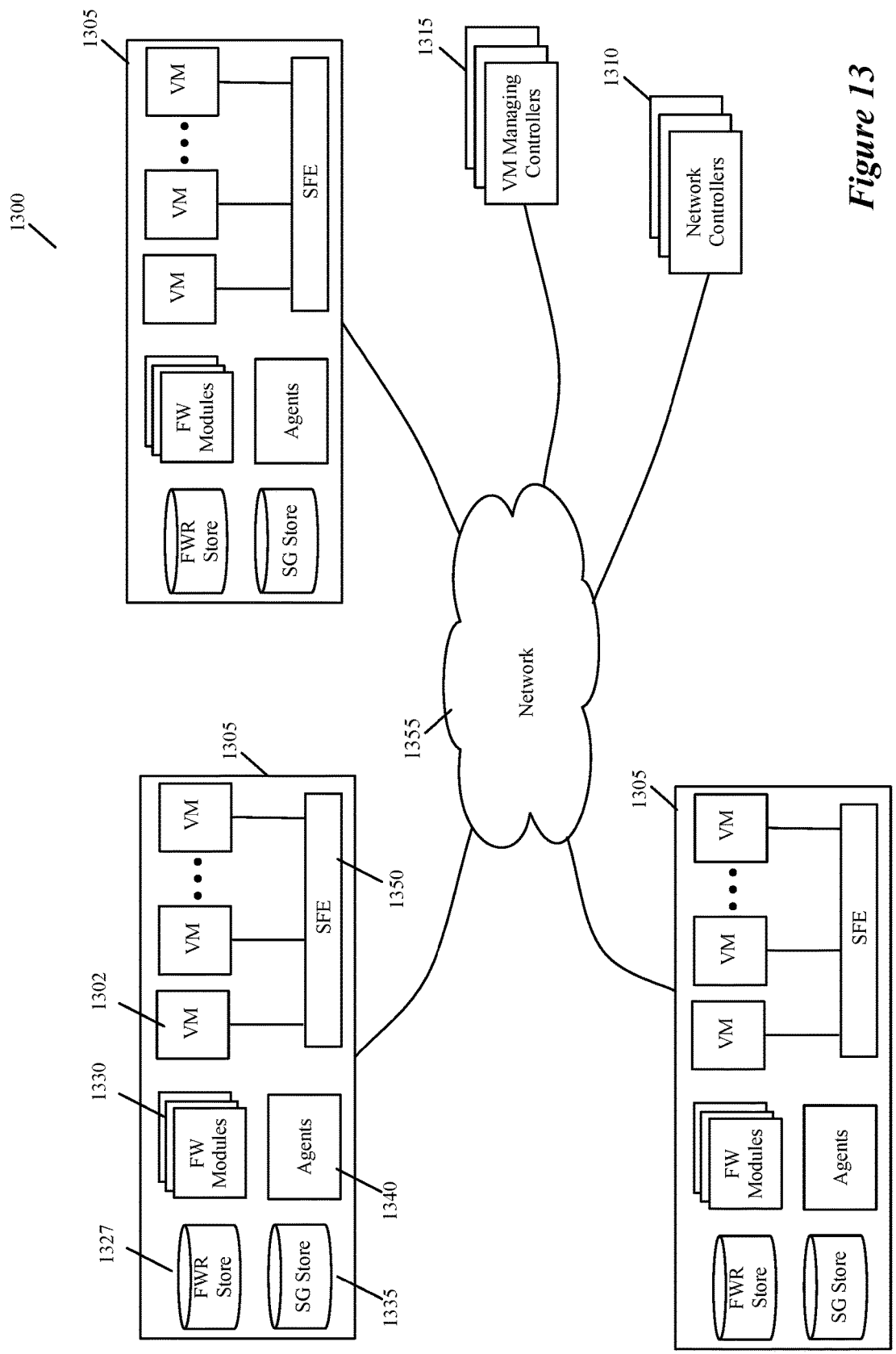
FIG. 13 illustrates a datacenter that has multiple such firewall service modules executing on multiple hosts.

As mentioned above, the firewall service nodes in some embodiments are firewall modules that execute on host computers along with one or more DCNs. FIG. 13 illustrates a datacenter 1300 that has multiple such firewall service modules 1330 executing on multiple hosts 1305. In some embodiments, the datacenter 1300 is a private datacenter of an enterprise and all its tenants belong to one entity (e.g., one corporation). In other embodiments, the datacenter is a public datacenter used by many different unrelated tenants.

In this datacenter, each host computer 1305 can execute one or more guest VMs 1302 that perform compute operations (e.g., webserver, application server, database server operations) for one or more tenants of the datacenter 1300. As shown, each host executes one or more firewall service modules 1330 that perform firewall services for multiple VMs 1302 that execute on the host. Each host can also executes one or more service modules that perform one or more other service actions, such as encryption operations, load balancing operations, intrusion detection operations, intrusion prevention operations, and/or other middlebox service operations.

Each host computer 1305 executes one or more software forwarding elements 1330, such as a software switch or a software router. The software forwarding elements (SFEs) connect the VMs on their host computer 1305 and connect these VMs to other devices (e.g., other VMs) outside of the host.

As further described below by reference to FIG. 14, the firewall service modules 1330 of some embodiments are filter modules that are called by the virtual network interface controllers (VNICs) of the VMs or ports of the host's SFEs that connect to the VNICs. In some embodiments, the firewall modules 1330 on a host computer can perform their firewall operations by using firewall rules that are defined by reference to template identifiers, template instance identifiers, template matching criteria, and dynamic group identifiers. These rules are stored in the firewall rule data store 1327 along with non-template based firewall rules.

As described above and further described below, the firewall modules 1330 at times process the template-based firewall rules by retrieving and examining attributes stored in one or more dynamic groups, which include component dynamic groups (such as dynamic groups 405, 410, and 415) and template instance dynamic groups (such as dynamic groups 505 and 510). On each host, these dynamic groups are stored in a dynamic group storage 1335 in some embodiments.

As shown in FIG. 13, a set of one or more controller agents 1340 executes on each host computer 1305 to interact with various controllers (i.e., various managing servers). These controllers include network controllers 1310 and VM managing controllers 1315. The network controllers 1310 configure the SFEs 1350 on the hosts to implement several logical forwarding elements (LFEs), where each LFE can span multiple SFEs on multiple host computers. The network controllers also provide the template-based firewall rules and the non-template based firewall rules to each host, and update these rules whenever necessary. The VM managing controllers 1315 provision and deploy VMs on the hosts. The VM managing controllers 1315 also associate tags with the VMs and provide the dynamic groups to each hosts. The VM managing controllers 135 update these dynamic groups as VMs are added to or removed from dynamic groups and template instances are defined or deleted. The agent set 1340 interacts with these controllers 1310 and 1315 to provision, configure and update VMs, SFEs, firewall service rules, and dynamic groups. As shown, the datacenter's network 1355 communicatively connects all the hosts and controllers.

Figure 14:
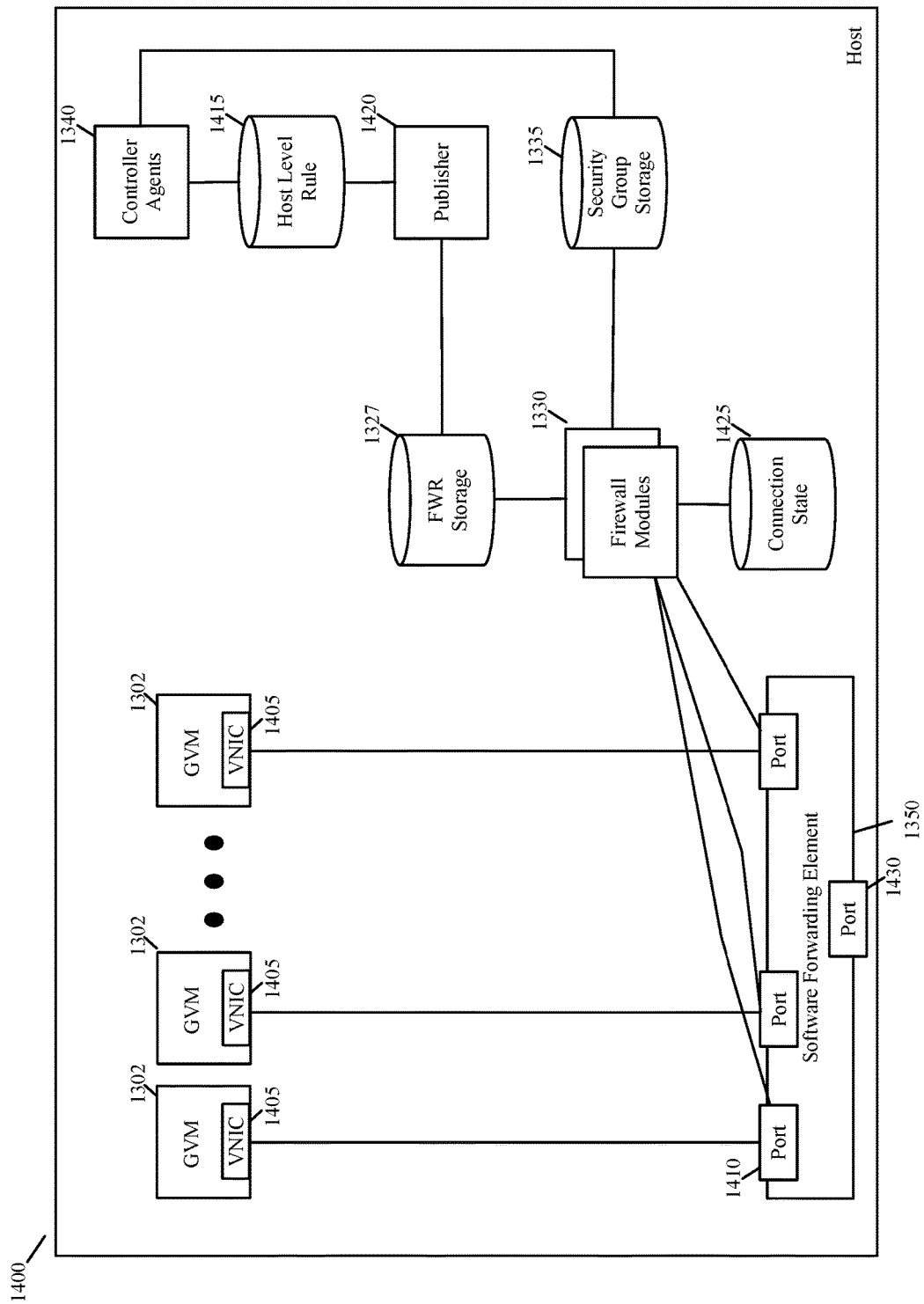
FIG. 14 illustrates in more detail the software architecture of a host computer of some embodiments.

FIG. 14 illustrates in more detail the software architecture of a host computer of some embodiments. This more detailed view illustrates the insertion of the firewall modules as filter modules that pair up with VMs executing on the host to capture data messages to and/or from the VMs. Like host 1305 of FIG. 13, the host computer 1400 includes (1) one or more VMs 1302, (2) an SFE 1350, (3) one or more service modules 1330, (4) agent set 1340, (5) firewall rule storage 1327 and (6) dynamic group storage 1335. As shown, the host 1400 also includes a host level rule storage 1415, a rule publisher 1420, and a connection state storage 1425.

The SFE 1350 executes on the host 1400 to communicatively couple the VMs of the host to each other and to other devices outside of the host (e.g., other VMs on other hosts) through the host's physical NIC (PNIC) and one or more forwarding elements (e.g., switches and/or routers) that operate outside of the host. As shown, the SFE 1350 includes a port 1430 to connect to a PNIC (not shown) of the host.

For each VM, the SFE 1350 also includes a port 1410 to connect to a VNIC 1405 of the VM. In some embodiments, the VNICs are software abstractions of the PNIC that are implemented by the virtualization software (e.g., by a hypervisor) on which the VMs operate. Each VNIC 1405 is responsible for exchanging messages between its VM and the SFE 1350 through its corresponding SFE port 1410. As shown, a VM's egress datapath for its data messages includes (1) the VM's VNIC 1405, (2) the SFE port 1410 that connects to this VNIC, (3) the SFE 1350, and (4) the SFE port 1430 that connects to the host's PNIC. The VM's ingress datapath is the same except in the reverse order (i.e., first the port 1430, then the SFE 1350, then the port 1410, and finally the VNIC 1405).

In some embodiments, the SFE 1350 is a software switch, while in other embodiments it is a software router or a combined software switch/router. The SFE 1350 in some embodiments implements one or more logical forwarding elements (e.g., logical switches or logical routers) with SFEs executing on other hosts in a multi-host environment. A logical forwarding element in some embodiments can span multiple hosts to connect VMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the VMs of one logical network from the VMs of another logical network that is serviced by another logical forwarding element. A logical forwarding element can connect VMs executing on the same host and/or different hosts.

Through its port 1430 and a NIC driver (not shown), the SFE 1350 connects to the host's PNIC to send outgoing messages and to receive incoming messages. The SFE 1350 performs message-processing operations to forward messages that it receives on one of its ports to another one of its ports. For example, in some embodiments, the SFE tries to use header values in the data message to match the message to flow based rules, and upon finding a match, to perform the action specified by the matching rule (e.g., to hand the message to one of its ports 1410 or 1430, which directs the message to a destination VM or to the PNIC). In some embodiments, the SFE extracts from a data message a logical network identifier (e.g., a VNI) and a MAC address. The SFE in these embodiments uses the extracted VNI to identify a logical port group, and then uses the MAC address to identify a port within the port group.

The SFE ports 1410 in some embodiments include one or more function calls to one or more service modules (such as firewall modules 1330) that implement special input/output (I/O) operations on incoming and outgoing messages that are received at the ports. Examples of such I/O operations include middlebox operations (e.g., firewall operations, load balancing operations, DNAT operations, DNS re-route operations, etc.), ARP proxy operations, message encapsulation operations (e.g., encapsulation operations needed for sending messages along tunnels to implement overlay logical network operations), etc. By implementing a stack of such function calls, the ports can implement a chain of I/O operations on incoming and/or outgoing messages in some embodiments. Instead of calling the I/O operators (including the firewall modules 1330) from the ports 1410, other embodiments call these operators from the VM's VNIC or from the port 1430 of the SFE.

In some embodiments, each firewall module 1330 pairs up with one VM 1302 (i.e., is associated with one VM 1302) to process data messages sent by the VM and/or received for the VM. To process these data messages, the firewall module 1330 uses template-based firewall rules and non-template-based firewall rules that are stored in the firewall rule storage 1327. In some embodiments, each firewall module 1330 has its own firewall rule storage that stores the firewall rules associated with the logical network to which its VM belongs. Also, in some embodiments, each firewall storage 1327 includes two separate storages, one to store template-based firewall rules, and one to store non-template-based firewall rules, while in other embodiments, each firewall storage 1327 stores both the template and non-template based firewall rules for a firewall module 1330.

In some embodiments, the SFE port 1410 connected to a VM's VNIC 1405 calls the VM's firewall module 1330 as it steps through the function call list that it processes for a data message that it receives from the VM (i.e., receives on the VM's egress path). Alternatively, or conjunctively, the SFE port 1410 calls the VM's firewall module 1330 as it process this VM's function call list for a data message that it receives for the VM (i.e., receives on VM's ingress path) from the SFE 1350.

Once called, the VM's firewall module 1330 first examines the connection state storage 1425 to determine whether this storage contains a record for the data message that the module 1330 is processing. In some embodiments, each firewall module 1330 has its own connection state storage 1425 that stores the connection states associated with this module's processing of the firewall rules. The firewall module 1330 in some embodiments examines the connection state storage 1425 for a data message by determining whether the state storage includes any connection record that has a record identifier (e.g., a five tuple identifier) that matches the message's header values (e.g., the message's five tuple identifier).

When the firewall module 1330 identifies for a data message, a connection record in the state storage 1425, the firewall module 1330 performs the action (e.g., Allow, Drop, Redirect, etc.) specified by this matching record on the data message. When the connection state record does not require the data message to be discarded, the firewall module 1330 then returns the data message to the SFE port 1410 so that the data message can be processed by the next service module or it can be forwarded by the SFE 1350 to its destination.

On the other hand, when the firewall module cannot identify a record in the connection state storage 1425 for a data message, the firewall module 1330 identifies a firewall rule in the firewall rule storage 1327 that matches the data message. In some embodiments, the firewall rule structure and firewall rule processing natively support the processing of firewall rules that are defined in terms of template identifiers, template matching criteria and/or security-group. The firewall rule processing in some of these embodiments also include the processing of non-template-based firewall rules that are defined in terms of traditional firewall rule qualifiers, such as the five tuple identifiers for L3 firewall rules, or L2 identifiers (e.g., MAC address) for L2 firewall rule.

When processing a non-template-based firewall rule, the firewall module 1330 compares the message's header values with the firewall rule's qualifier to determine whether the firewall rule matches the message. If so, the process performs the action (e.g., Allow, Drop, Redirect, etc.) specified by this matching rule on the data message, and stores a connection state record in the connection state storage 1425 that identifies the performed action for the message's header value. This connection state record can be used to process subsequent messages that are part of the same message flow as the message that the module 1330 processed by referencing the non-template-based firewall rule. When the firewall operation does not require the data message to be discarded, the firewall module 1330 then returns the data message to the SFE port 1410 so that the data message can be processed by the next service module or it can be forwarded by the SFE 1350 to its destination.

When processing a template-based firewall rule, the firewall module 1330 in these embodiments, tries to match a message's header attributes and/or template/security-group attributes to a firewall rule's qualifiers (rule identifiers), and when it matches the message to a firewall rule, it then performs the action on the message based on the matching firewall rule's firewall action parameter. As mentioned above, the dynamic group storage 1335 stores the dynamic groups and their associated attributes. When checking a template-based firewall rule that specifies a component dynamic group for its source or destination tuples, the firewall module 1330 of some embodiments determines whether the data message's source or destination attributes (e.g., the data message's source or destination IP address) belongs to the component dynamic group that is stored in the dynamic group storage 1335. If so, the firewall engine 1330 in some embodiments uses the template instance identifier that the matching component dynamic group specifies for the data message attribute (e.g., for the message IP address) to identify the template instance dynamic group to which the addressed source or destination node belongs.

The firewall engine then accesses the identified template instance dynamic group in the dynamic group storage 1335 to retrieve template instance attributes of the data message's source or destination node, and then uses these retrieved template instance attributes to further process the firewall rule. When the data message's header attributes and/or template/dynamic group attributes match a firewall rule, the firewall engine determines that the data message matches the firewall rule and then performs the firewall action (e.g., Allow, Drop, Redirect, etc.) specified by this matching rule on the data message, and stores a connection state record in the connection state storage 1425 that identifies the performed action for the message's header value. This connection state record can be used to process subsequent messages that are part of the same message flow as the message that the module 1330 processed by referencing the non-template-based firewall rule. When the firewall operation does not require the data message to be discarded, the firewall module 1330 then returns the data message to the SFE port 1410 so that the data message can be processed by the next service module or it can be forwarded by the SFE 1350 to its destination.

In some embodiments, the controller agent set 1340 receives template-based firewall rules, non-template based firewall rules, and updates to these rules from the network controllers 1310. The controller agent set 1340 stores these rules and rule updates in the host-level rule storage 1415. In some embodiments, the publisher 1420 then stores these rules and rule updated to different firewall rule storages 1327 of different firewall modules 1330. The controller agent set 1340 also receives dynamic group definitions and updates from the VM managing controllers 1315, and stores these dynamic group definitions and updates in the dynamic group storage 1335. The dynamic group updates can add or remove component members to one or more dynamic groups. Members are added to or removed from a dynamic group by adding or removing the component members' attributes from the dynamic group in some embodiments.

The firewall approach illustrated in FIGS. 13 and 14 can be extended to perform other services by using other template-based service rules. Specifically, in the I/O chain of operators for a VM, other service modules can be inserted that would perform their service operations based on service rules that are defined by reference to template identifiers, template instance identifiers, template matching criteria, and/or dynamic group identifiers. In some embodiments, these service modules would be called by the VM's VNIC or the SFE port that connects to this VNIC.

In some embodiments, such a service module tries to match a message's header attributes and/or template/security-group attributes to the qualifier (rule identifiers) of the service rules, and when it matches the message to a service rule, it then performs a service action on the message based on the matching service rule's service parameter(s). For example, when checking a template-based service rule that specifies a dynamic group to define its source or destination tuple, the service module of some embodiments determines whether a source or destination attribute (e.g., IP address) of the message's header belongs to the dynamic group, which is stored in the dynamic group storage 1335.

If so, the service module in some embodiments uses the template instance identifier that the matching dynamic group specifies for the message attribute (e.g., for the IP address) to identify the template instance dynamic group (again stored in the dynamic group storage 1335) to which the addressed source or destination belongs. The service engine then accesses the identified template instance dynamic group to retrieve template instance attributes of the message's source or destination, and then uses these retrieved template instance attributes to further process the service rule. When the message's header attributes and/or template/dynamic group attributes match a service rule, the service module determines that the message matches the service rule and then performs the service action as specified by the rule's service parameter or parameters.

Many of the above-described features and applications are implemented as software processes that are specified as a set of instructions recorded on a computer readable storage medium (also referred to as computer readable medium).

When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
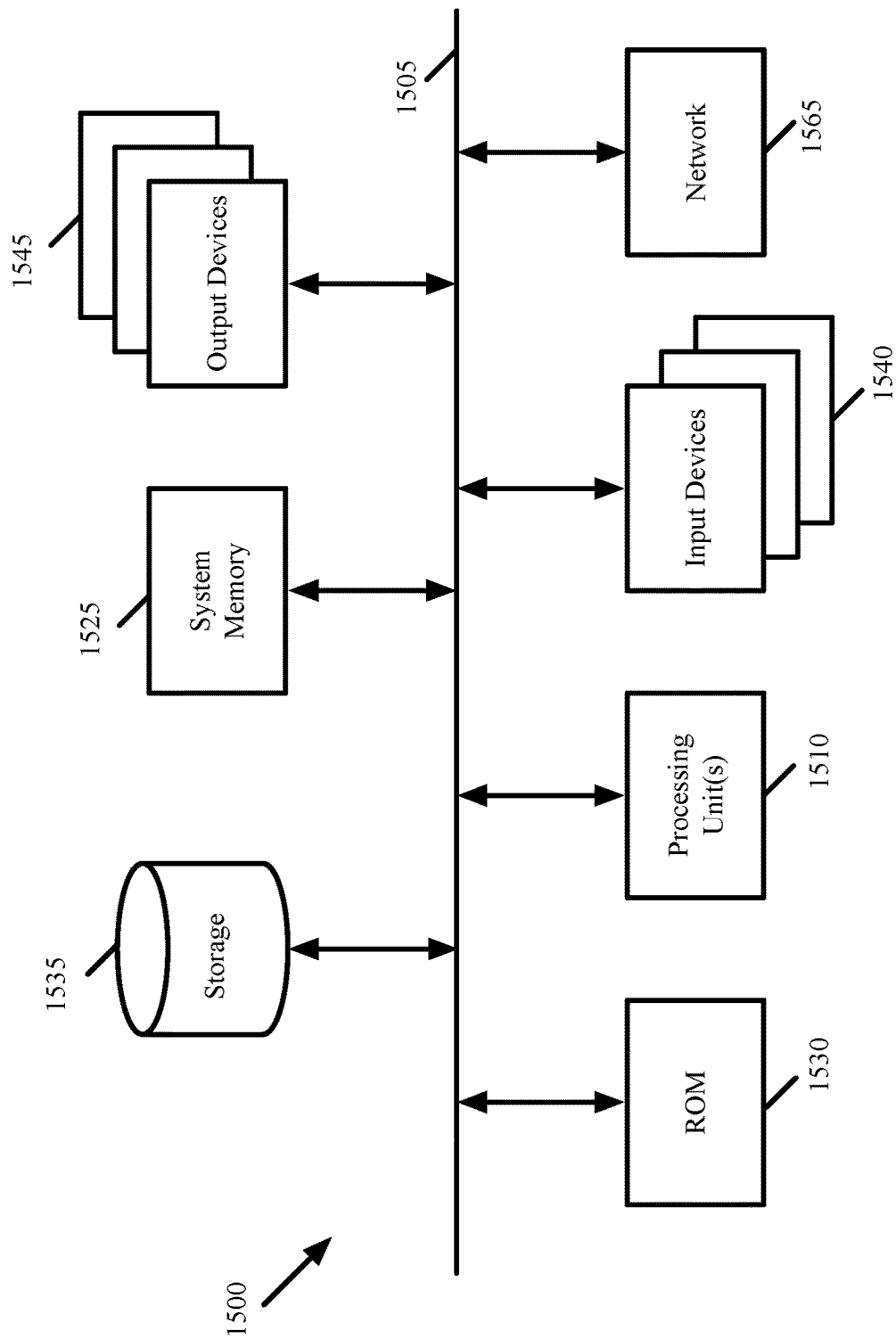
FIG. 15 illustrates an electronic system with which some embodiments of the invention are implemented.

FIG. 15 conceptually illustrates a computer system 1500 with which some embodiments of the invention are implemented. The computer system 1500 can be used to implement any of the above-described hosts, controllers, and managers. As such, it can be used to execute any of the above described processes. This computer system includes various types of non-transitory machine readable media and interfaces for various other types of machine readable media. Computer system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the computer system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments. The read-only-memory (ROM) 1530 stores static data and instructions that are needed by the processing unit(s) 1510 and other modules of the computer system. The permanent storage device 1535, on the other hand, is a read-and-write memory device. This device is a non-volatile memory unit that stores instructions and data even when the computer system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the computer system. The input devices 1540 include alphanumeric keyboards and pointing devices (also called "cursor control devices"). The output devices 1545 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples computer system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of computer system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, some embodiments do not employ template instance dynamic groups as these embodiments store the attributes of a component of a template instance in that component's dynamic group.

Also, this specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc. One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

A number of the figures (e.g., FIGS. 7 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, one of ordinary skill in the art would understand that the invention is not to be limited by the foregoing illustrative details, but rather is to be defined by the appended claims.

The invention claimed is:

1. A method of specifying service rules, the method comprising:
    specifying a first set of service rules for a first template and a second set of service rules for a second template with each service rule in each of the first and second sets including (1) a service parameter for performing a service on data messages, and (2) a rule identifier for matching to data message attribute sets, each rule identifier of each rule comprising at least a template identifier for identifying the template associated with the rule, each template for deploying a multi-tier application in a datacenter; and
    distributing the first set of service rules to a first service node in the datacenter, and the second set of service rules to a second service node in the datacenter, each of the first and second service nodes comparing the rule identifiers of the service rules with the data message attribute sets in order to identify service rules that match the data messages that the first or second service node processes, each of the first and second service nodes comparing the rule identifiers and attribute sets by comparing the template identifiers of the rules with the template identifiers associated with the data messages.

2. The method of claim 1, wherein the template identifiers associated with the data messages comprise template identifiers associated with at least the sources of the data messages or the destinations of the data messages.

3. The method of claim 1, wherein the template identifiers associated with the data messages comprise template identifiers associated with at least the sources and the destinations of the data messages.

4. The method of claim 3, wherein a template identifier is associated with the source and destination of a data message when the source and destination are network nodes that were deployed based on node definitions provided by the template specified by the template identifier.

5. The method of claim 1, wherein distributing the first set of service rules comprises distributing the first set of service rules to a plurality of service nodes.

6. The method of claim 1, wherein the first and second sets of service rules are identical.

7. The method of claim 1, wherein the first and second sets of service rules are different.

8. The method of claim 1, wherein the first and second sets of service rules have a plurality of service rules that overlap and a plurality of service rules that only exist in one of the first set of service rules and the second set of service rules.

9. The method of claim 1, wherein at least one rule identifier for at least one service rule comprises at least two different template identifiers to specify that the service rule is associated with two different templates.

10. The method of claim 1, wherein distributing the set of service rules comprises distributing the set of service rules with a rule precedence hierarchy that defines a priority value for each service rule, such that rules with higher priority are processed by the service node before rules with lower priority.

11. The method of claim 10, wherein the rule precedence hierarchy implicitly defines priority values for the rules based on an order in which the rules appear in a storage structure used to distribute the set of service rules.

12. The method of claim 10, wherein the rule precedence hierarchy explicitly defines priority values for the rules in a storage structure used to distribute the set of service rules.

13. The method of claim 1, wherein each rule identifier includes n identifying tuples, and at least one rule identifier includes a wildcard value for at least one of its n identifying tuples.

14. The method of claim 13, wherein
    each rule identifier's n identifying tuples include a source identifier and a destination identifier,
    at least one particular rule identifier's source or destination identifier is defined by reference to a group identifier that identifies a group storage structure that stores a plurality of attributes for a plurality of network nodes, when processing the particular rule for a particular data message, the service node determines that the particular data message has an attribute that is stored in the group storage structure and retrieves the particular data message's template identifier from the group storage structure.

15. The method of claim 13, wherein each rule identifier's n identifying tuples include a source identifier and a destination identifier, at least one particular rule identifier's source or destination identifier is defined by reference to a group identifier that identifies a first group storage structure that stores a plurality of attributes for a plurality of network nodes, when processing the particular rule for a particular data message, the service node determines that the particular data message has a particular attribute that is stored in the first group storage structure and retrieves the particular data message's template identifier from a second group storage structure that is identified by a record in the first group storage structure for the particular attribute.

16. The method of claim 1, wherein the service node is a service module that executes on a host machine along with a plurality of data compute nodes that are sources or destinations of the data messages processed by the service module.

17. The method of claim 1, wherein the service node is a standalone service appliance.

18. A non-transitory machine readable medium storing a program for specifying service rules, the program comprising sets of instructions for:

specifying a first set of service rules for a first template and a second set of service rules for a second template with each service rule in each of the first and second sets including (1) a service parameter for performing a service on data messages, and (2) a rule identifier for matching to data message attribute sets, each rule identifier of each rule comprising at least a template identifier for identifying the template associated with the rule, each template for deploying a multi-tier application in a datacenter; and distributing the first set of service rules to a first service node in the datacenter, and the second set of service rules to a second service node in the datacenter, each of the first and second service nodes comparing the rule identifiers of the service rules with the data message attribute sets in order to identify service rules that match the data messages that the first or second service node processes, each of the first and second service nodes comparing the rule identifiers and attribute sets by comparing the template identifiers of the rules with the template identifiers associated with the data messages.

19. The non-transitory machine readable medium of claim 18, wherein deploying a multi-tier application in a datacenter comprises deploying a plurality of instantiations of the multi-tier application in the datacenter.

* * * * *